United States Patent
Reaves et al.

(10) Patent No.: US 10,422,631 B2
(45) Date of Patent: Sep. 24, 2019

(54) OPTICAL FIBER AND METHOD AND APPARATUS FOR ACCURATE FIBER OPTIC SENSING UNDER MULTIPLE STIMULI

(71) Applicant: LUNA INNOVATIONS INCORPORATED, Roanoke, VA (US)

(72) Inventors: Matthew T. Reaves, Baltimore, MD (US); Brian M. Rife, Newport, VA (US); Evan M. Lally, Blacksburg, VA (US); Stephen T. Kreger, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 112 days.

(21) Appl. No.: 15/525,306

(22) PCT Filed: Nov. 11, 2015

(86) PCT No.: PCT/US2015/060104
§ 371 (c)(1),
(2) Date: May 9, 2017

(87) PCT Pub. No.: WO2016/122742
PCT Pub. Date: Aug. 4, 2016

(65) Prior Publication Data
US 2018/0195856 A1    Jul. 12, 2018

Related U.S. Application Data
(60) Provisional application No. 62/077,974, filed on Nov. 11, 2014.

(51) Int. Cl.
*G01D 5/353* (2006.01)
*G01B 11/16* (2006.01)
(Continued)

(52) U.S. Cl.
CPC ......... *G01B 11/16* (2013.01); *G01D 5/35303* (2013.01); *G01D 5/35316* (2013.01);
(Continued)

(58) Field of Classification Search
CPC ............... G01D 5/353; G01D 5/35303; G01D 5/35316; G01D 5/35361; G01B 11/16; G02B 6/02042
See application file for complete search history.

(56) References Cited

U.S. PATENT DOCUMENTS

| | | |
|---|---|---|
| 5,563,967 A | 10/1996 | Haake |
| 5,798,521 A | 8/1998 | Froggatt |

(Continued)

FOREIGN PATENT DOCUMENTS

| | | |
|---|---|---|
| CA | 2600621 A1 | 3/2008 |
| CA | 2600621 C | 2/2011 |

(Continued)

OTHER PUBLICATIONS

European Supplementary Search Report dated Aug. 14, 2018 in EP Application No. 15880620.8, 11 pages.

(Continued)

*Primary Examiner* — Jonathan M Hansen
(74) *Attorney, Agent, or Firm* — Nixon & Vanderhye P.C.

(57) ABSTRACT

An optical fiber includes primary optical core(s) having a first set of properties and secondary optical core(s) having a second set of properties. The primary set of properties includes a first temperature response, and the secondary set of properties includes a second temperature response sufficiently different from the first temperature response to allow a sensing apparatus when coupled to the optical fiber to distinguish between temperature and strain on the optical fiber. A method and apparatus interrogate an optical fiber having one or more primary optical cores with a first (Continued)

temperature response and one or more secondary optical cores with a second temperature response. Interferometric measurement data associated with each primary and secondary optical core are detected when the optical fiber is placed into a sensing position. Compensation parameter(s) is(are) determined to compensate for measurement errors caused by temperature variations along the optical fiber based on a difference between the first temperature response of the primary cores and the second temperature response of the secondary cores. The detected data are compensated using the compensation parameter(s).

27 Claims, 21 Drawing Sheets

(51) Int. Cl.
*G02B 6/02* (2006.01)
*G01M 11/00* (2006.01)

(52) U.S. Cl.
CPC ..... *G01D 5/35361* (2013.01); *G01M 11/3172* (2013.01); *G02B 6/02042* (2013.01)

(56) References Cited

U.S. PATENT DOCUMENTS

| | | | |
|---|---|---|---|
| 6,545,760 B1 | 4/2003 | Froggatt et al. | |
| 6,566,648 B1 | 5/2003 | Froggatt | |
| 6,813,401 B1 | 11/2004 | Tennyson | |
| 7,512,292 B2 | 3/2009 | MacDougall et al. | |
| 7,538,883 B2 | 5/2009 | Froggatt | |
| 7,772,541 B2 | 8/2010 | Froggatt et al. | |
| 7,781,724 B2 | 8/2010 | Childers et al. | |
| 7,903,908 B2 | 3/2011 | MacDougall et al. | |
| 8,400,620 B2 | 3/2013 | Froggatt et al. | |
| 8,531,655 B2* | 9/2013 | Klein | G01B 11/161 356/477 |
| 8,714,026 B2 | 5/2014 | Froggatt | |
| 8,773,650 B2 | 7/2014 | Froggatt et al. | |
| 2002/0146226 A1* | 10/2002 | Davis | G02B 6/02042 385/126 |
| 2003/0103549 A1 | 6/2003 | Chi et al. | |
| 2006/0013523 A1 | 1/2006 | Childers et al. | |
| 2008/0002187 A1 | 1/2008 | Froggatt | |
| 2008/0063337 A1* | 3/2008 | MacDougall | G01K 11/3206 385/12 |
| 2009/0225807 A1 | 9/2009 | MacDougall et al. | |
| 2010/0284646 A1 | 11/2010 | Chiang et al. | |
| 2011/0113852 A1 | 5/2011 | Prisco | |
| 2012/0069347 A1 | 3/2012 | Klein et al. | |
| 2012/0281205 A1 | 11/2012 | Askins | |
| 2014/0042306 A1 | 2/2014 | Hoover et al. | |
| 2014/0320846 A1 | 10/2014 | Froggatt et al. | |
| 2015/0086157 A1* | 3/2015 | Fontaine | G02B 6/14 385/28 |
| 2017/0235042 A1* | 8/2017 | Sasaki | G02B 6/02 385/126 |

FOREIGN PATENT DOCUMENTS

| | | |
|---|---|---|
| EP | 2382496 A2 | 11/2011 |
| EP | 2035792 A4 | 5/2013 |
| EP | 2382496 A4 | 11/2013 |
| WO | 2007149230 A2 | 12/2007 |
| WO | 2007149230 A3 | 3/2008 |
| WO | 2010077902 A2 | 7/2010 |
| WO | 2010077902 A3 | 7/2010 |
| WO | WO 2012/038784 | 3/2012 |
| WO | 2013/030749 | 3/2013 |
| WO | 2013/136247 | 9/2013 |
| WO | 2016122742 A2 | 8/2016 |

OTHER PUBLICATIONS

International Search Report for PCT/US2015/060104 dated Aug. 29, 2016, 4 pages.
Written Opinion of ISA for PCT/US2015/060104 dated Aug. 29, 2016, 6 pages.
International Preliminary Report on Patentability for PCT/US2015/060104 dated Aug. 29, 2016, 14 pages.
Cavleiro et al., "simultaneous measurement of strain and temperature using Bragg Gratings written in germanosilicate and boron-codoped germanosilicate fibers", IEEE Photonics Technology Letters, vol. 11, No. 12, pp. 1635-1637, Dec. 12, 1999.
Cavaleiro, P.M. et al., "Simultaneous Measurement of Strain and Temperature Using Bragg Gratings Written in Germanosilicate and Boron-Codoped Germanosilicate Fibers," IEEE Photonics Technology Letters, vol. 11, No. 12, Dec. 1999, pp. 1635-1637.
Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.
Y.-J. Kim, U.-C. Paek and H. L. Byeong, "Measurement of refractive-index variation with temperature by use of long-period fiber gratings," Optics Letters, vol. 27, No. 15, pp. 1297-1299, Aug. 1, 2002.
A. Othonos and K. Kalli, "Fiber Bragg gratings: fundamentals and applications in telecommunications and sensing" Artech House, 1999, Chapter 3, pp. 95-147.

* cited by examiner

Fiber End View

Map of Unwrapped Helix

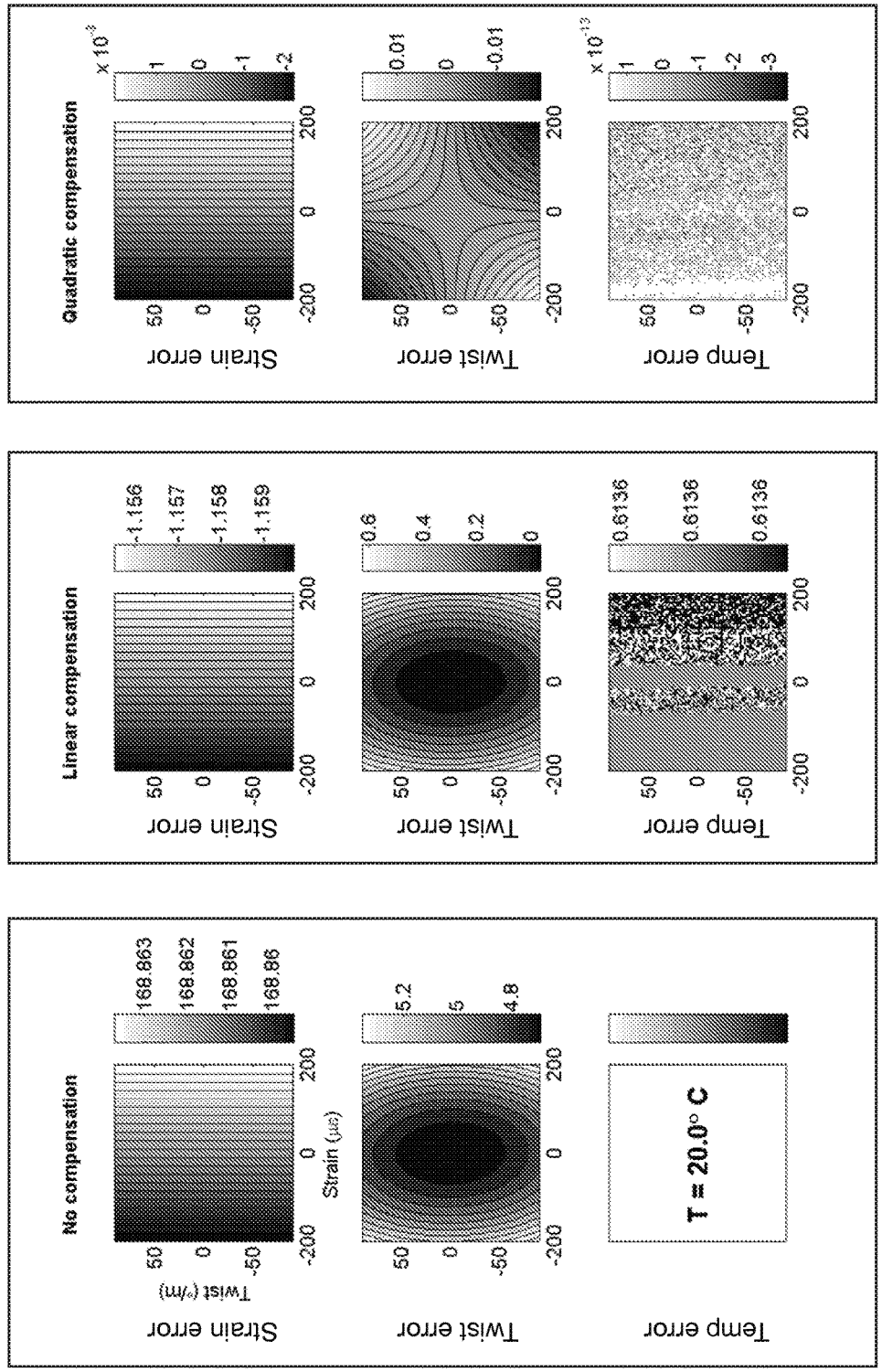

OPTICAL FIBER AND METHOD AND APPARATUS FOR ACCURATE FIBER OPTIC SENSING UNDER MULTIPLE STIMULI

PRIORITY APPLICATION

This application is the U.S. national phase of International Application No. PCT/US2015/060104 filed on Nov. 11, 2015 which designated the U.S. and claims priority from U.S. provisional patent application Ser. No. 62/077,974, filed on 11 Nov. 2014, the contents of each of which are incorporated herein by reference.

This invention was made with government support under Contract No. 2014-14071000012 awarded by the IARPA. The government has certain rights in the invention.

TECHNICAL FIELD

The technology relates to interferometric sensing applications. One example application is to Optical Frequency Domain Reflectometry (OFDR) sensing using Rayleigh and/or Bragg scatter in optical fiber.

BACKGROUND AND SUMMARY

Optical Frequency Domain Reflectometry (OFDR) is an effective technique for extracting external sensory information from the response of an optical fiber. See, e.g., U.S. Pat. Nos. 6,545,760; 6,566,648; 5,798,521; and 7,538,883. OFDR systems rely on scattering mechanisms, such as Rayleigh or Bragg scatter, to monitor phenomena that change the time-of-flight delay ("delay") or spectral response of the optical fiber (see, e.g. U.S. Pat. No. 8,714,026). Many optical scattering mechanisms, including but not limited to Rayleigh and Bragg scatter, are sensitive to both temperature and strain. Through fiber and/or transducer design, these mechanisms can be made to sense other external parameters, such as shape, position, pressure, etc.

Existing Rayleigh or Bragg scattering-based sensors cannot distinguish the difference between temperature and strain. Both temperature and strain effects appear as a shift in the sensor's spectral response and as a stretching or compressing of its delay response. In practical applications, this cross-sensitivity between temperature and strain can generate errors in the sensor's measurement. In more complicated sensors, such as those designed to measure shape and position, this cross-sensitivity also contributes to error in the sensor's measured output.

In fiber optic-based shape sensing, a multi-channel distributed strain sensing system is used to detect the change in strain for each of several cores within a multi-core optical shape sensing fiber, as described in U.S. Pat. No. 8,773,650, which is incorporated herein by reference. Multiple distributed strain measurements are combined using a system of equations to produce a set of physical measurements including curvature, twist, and axial strain as described in U.S. Pat. No. 8,531,655, which is also incorporated herein by reference. These physical measurements can be used to determine the distributed shape and position of the optical fiber. Shape and position computations may be performed using a linear shape computation matrix that is preferably calculated using a calibration process. This calibration matrix is a property of a given sensor, and it may be stored and applied to one or more subsequent sets of distributed strain measurements at each of multiple points along the optical fiber.

Multi-core fiber has been shown to be a practical, physically-realizable solution for distributed sensing. However, the shape sensing systems described in the above patents do not distinguish between temperature changes along the length of the fiber and axial strain changes along the length of the fiber. Moreover, an error can manifest for certain shape sensing fibers dependent on a combination of axial strain and temperature change applied to the sensing fiber. Another challenge is that a fiber's response to various stimuli also exhibits a nonlinear response. Such stimuli include strain, temperature, and extrinsically-applied twist. A linear shape computation matrix, such as described above, may not be sufficient to produce high accuracy results in the presence of these stimuli.

One aspect of the technology concerns an optical fiber that includes one or more primary optical cores having a first set of properties and one or more secondary optical cores having a second set of properties. The primary set of properties includes a first temperature response, and the secondary set of properties includes a second temperature response sufficiently different from the first temperature response to allow a sensing apparatus when coupled to the optical fiber to distinguish between temperature and strain on the optical fiber.

In example applications, the optical fiber is configured as a temperature sensor that senses temperature independently from strain.

In example applications, the optical fiber is configured as a strain sensor that senses strain independently from temperature.

In example applications, the difference in optical properties among the sets of cores is achieved by varying the doping level in each set of cores during fiber manufacture.

In an example application, the primary set of cores includes four cores, the secondary set of cores includes one core, and the primary and second sets of cores are helically twisted. In another example application, the primary set of cores include four cores, the secondary set of cores includes three cores, and the primary and second sets of cores are helically twisted. In yet another application, the primary and second sets of cores are configured such that one core runs down the central axis of the fiber and the remaining cores are arranged in a regular pattern at constant radius and traverse a helical path along the fiber.

In example embodiments, a temperature response coefficient that scales applied temperature change to measured spectral shift is at least 2% larger or smaller in the secondary core(s) than in the primary core(s) so that temperature can be distinguished from strain.

Another aspect of the technology concerns a method for interrogating an optical fiber having one or more primary optical cores with a first temperature response and one or more secondary optical cores with a second temperature response. The method includes the steps of detecting interferometric measurement data associated with each of the one or more primary optical cores and each of the one or more secondary optical cores when the optical fiber is placed into a sensing position, determining one or more compensation parameters that compensate for measurement errors caused by temperature variations along the optical fiber based on a difference between the first temperature response of the primary cores and the second temperature response of the secondary cores, compensating the detected interferometric measurement data using the one or more compensation parameters, and generating measurement data based on the compensated interferometric measurement data.

In example embodiments, the generated measurement data may be strain data compensated for temperature variations along the optical fiber and/or temperature data compensated for strain variations along the optical fiber.

In one example application, the further includes displaying the generated measurement data on a display or storing the measurement data in memory.

In example embodiments, the interferometric measurement data is detected using Optical Frequency Domain Reflectometry (OFDR) and the generated measurement data includes a fully-distributed measurement of both temperature and strain along the optical fiber.

In example embodiments, the optical fiber is a shape sensing fiber and the method further comprises a calculation of shape and position which accounts for a linear response and a non-linear response of the optical fiber to external stimuli in the detected interferometric measurement data. In this case, the non-linear response includes second-order responses to temperature, strain, twist, and curvature in the detected interferometric measurement data. The compensating step includes introducing a temperature measurement term in a shape computation matrix to eliminate twist measurement error resulting from the difference between the first temperature response of the primary cores and the second temperature response of the secondary cores, and wherein the temperature measurement term is based on the second temperature response.

A shape computation may be performed using multiple shape computation matrices to represent a system of equations that describe the linear and nonlinear responses of the optical fiber to external stimuli in the detected interferometric measurement data. The shape computation matrices characterize the linear and non-linear responses of the optical fiber including inter-dependence of first-order and second-order strain, temperature, twist, and curvature.

In example embodiments, calibration interferometric measurement data may be detected including linear and non-linear responses of the optical fiber after individually isolating each of multiple stimulus parameters including temperature, strain, twist, and curvature. The shape computation matrices are then compensated based on the calibration interferometric measurement data. Alternatively, calibration interferometric measurement data produced in response to multiple linearly-independent sets of stimuli vectors may be detected, and the shape computation matrices are calibrated based on the calibration interferometric measurement data to account for a non-minimized response to the multiple linearly-independent sets of stimuli vectors. Still further, the calibrated shape computation matrices may be applied to the detected interferometric measurement data using a calculated or approximated inverse of the Jacobian matrix of the system of equations. The approximation to the inverse of the Jacobian matrix of the system of equations may be pre-computed.

Example embodiments minimize or reduce a twist measurement error resulting from differences in strain and/or temperature response by tailoring a doping level of one or more of the cores.

BRIEF DESCRIPTION OF THE DRAWINGS

FIGS. 17A-17C show example temperature, twist, and strain errors with no compensation, linear compensation, and quadratic compensation.

DETAILED DESCRIPTION

Figure 1:
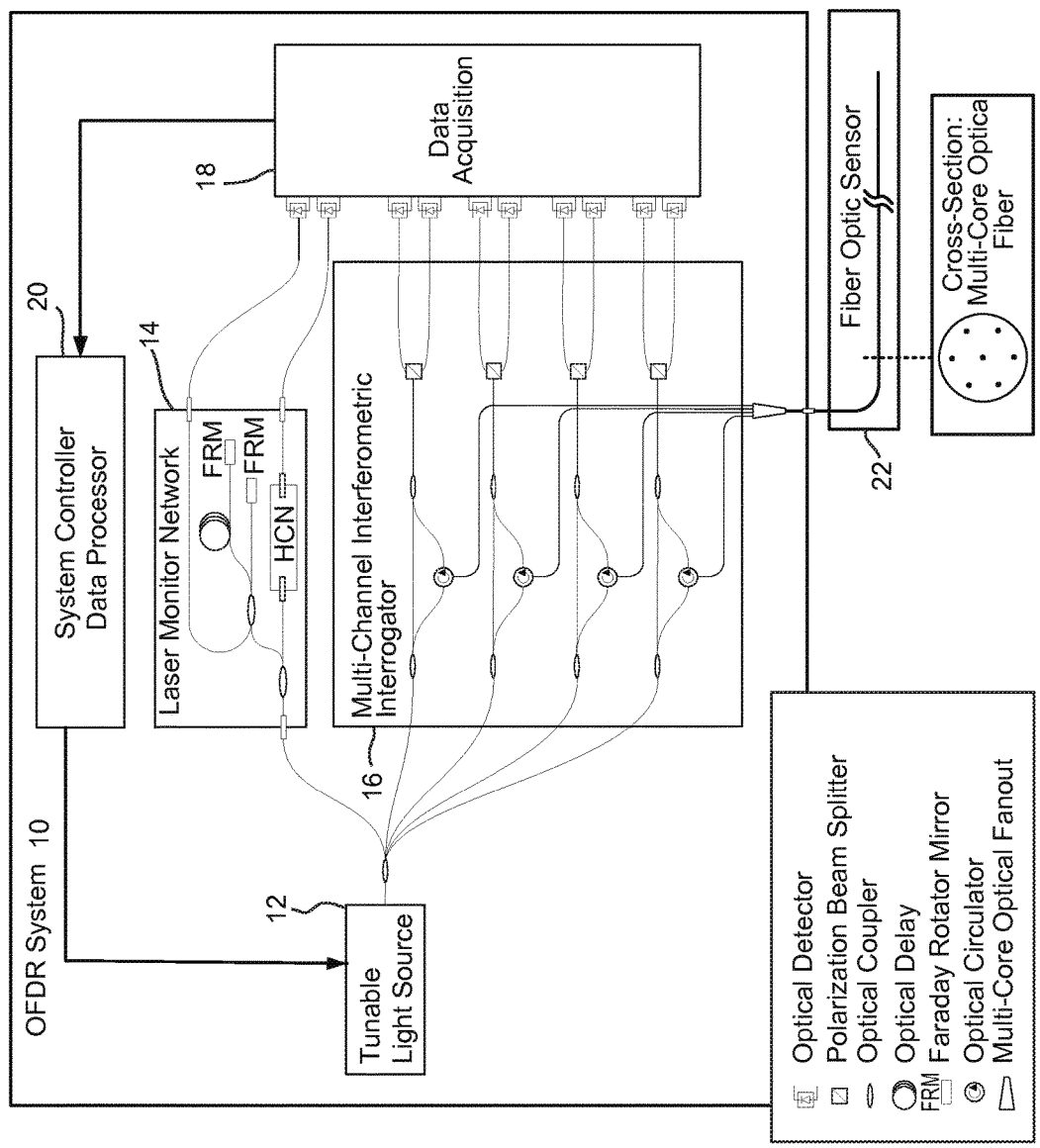
FIG. 1 is a non-limiting example setup of an OFDR system used to monitor local changes of index of refraction along the length of a fiber optic sensor useful in one or more measurement and/or sensing applications.

The following description sets forth specific details, such as particular embodiments for purposes of explanation and not limitation. It will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using optical components, electronic components, hardware circuitry (e.g., analog and/or discrete logic gates interconnected to perform a specialized function, ASICs, PLAs, etc.), and/or using software programs and data in conjunction with one or more digital microprocessors or general purpose computers. Moreover, certain aspects of the technology may additionally be considered to be embodied entirely within any form of computer-readable memory, such as, for example, solid-state memory, magnetic disk, optical disk, etc. containing an appropriate set of computer instructions that may be executed by a processor to carry out the techniques described herein.

The term "signal" is used herein to encompass any signal that transfers information from one position or region to another in an electrical, electronic, electromagnetic, optical, or magnetic form. Signals may be conducted from one position or region to another by electrical, optical, or magnetic conductors including via waveguides, but the broad scope of electrical signals also includes light and other electromagnetic forms of signals (e.g., infrared, radio, etc.) and other signals transferred through non-conductive regions due to electrical, electronic, electromagnetic, or magnetic effects, e.g., wirelessly. In general, the broad category of signals includes both analog and digital signals and both wired and wireless mediums. An analog signal includes information in the form of a continuously variable physical quantity, such as voltage; a digital electrical signal, in contrast, includes information in the form of discrete values of a physical characteristic, which could also be, for example, voltage.

Unless the context indicates otherwise, the terms "circuitry" and "circuit" refer to structures in which one or more electronic components have sufficient electrical connections to operate together or in a related manner. In some instances, an item of circuitry can include more than one circuit. A "processor" is a collection of electrical circuits that may be termed as a processing circuit or processing circuitry and may sometimes include hardware and software components. In this context, software refers to stored or transmitted data that controls operation of the processor or that is accessed by the processor while operating, and hardware refers to components that store, transmit, and operate on the data. The distinction between software and hardware is not always clear-cut, however, because some components share characteristics of both. A given processor-implemented software component can often be replaced by an equivalent hardware component without significantly changing operation of circuitry, and a given hardware component can similarly be replaced by equivalent processor operations controlled by software.

Hardware implementations of certain aspects may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

Circuitry can be described structurally based on its configured operation or other characteristics. For example, circuitry that is configured to perform control operations is sometimes referred to herein as control circuitry and circuitry that is configured to perform processing operations is sometimes referred to herein as processing circuitry.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed.

Overview

The technology described below is directed to a multi-core sensing fiber along with a method and apparatus for interrogating such a fiber, in which the properties of individual cores in a multi-core optical fiber are tailored to allow the system to distinguish the difference between temperature and strain. The existence of multiple optical cores allows fiber designers freedom to tailor the temperature response of one or more cores relative to the others which results a higher-fidelity resolution of strain vs. temperature than other previously attainable. The technology in this application improves measurement accuracy in a variety of sensors, including strain sensors, temperature sensors, and shape and position sensors, among others. One example embodiment includes both types of sensing cores within the same monolithic glass fiber so that those cores experience the same strain and temperature as compared to co-locating separate individual sensors.

In example embodiments, the accuracy of fiber optic shape and position measurements is enhanced by correcting for the second-order responses of the various stimuli experienced by the shape sensing optical fiber. This nonlinear correction includes calibration and computation methods, both of encompass the temperature/strain discrimination approach as an integral part of the computation.

Example embodiments of the sensing technology are described in which an additional optical core is manufactured in the fiber to have a different doping from the standard fiber sensing core(s). The doping difference generates a different response which is used to distinguish temperature from axial strain, resulting in a strain-independent temperature sensor or a temperature-compensated strain sensor.

Example embodiments of a temperature-compensated strain sensor are described in which the interrogation of an alternately-doped additional core allows accurate measurement of strain in uncontrolled temperature conditions. Because it can provide a fully-distributed measurement of both temperature and strain, this technique is particularly effective in applications in which the uncontrolled temperature varies along the length of the fiber.

Example embodiments of a temperature sensor are described in which the interrogation of an alternately-doped outer core renders the OFDR sensing system able to measure temperature without error due to undesired strain. Such errors are commonly encountered in practical applications and limit the accuracy of existing distributed fiber optic temperature sensors.

Example embodiments of shape sensing systems and methods are described which eliminate errors in shape sensing with twisted multi-core optical fiber. One error relates to differences in the outer and central cores' response to strain and temperature that generate a twist measurement error under moderate-to-large axial strain or temperature changes. Another error relates to the multi-core optical fiber's nonlinear response to strain, temperature, and extrinsically-applied twist which contributes to measurement error, particularly in the case of large inputs, such as high levels of extrinsic twist.

In example shape sensing embodiments, a differently-doped core is added to the shape sensor's standard fiber sensing cores during manufacture. First, the doping difference is used to distinguish temperature from axial strain. Second, this temperature measurement introduces as an additional (e.g., a 5th) term in a shape computation matrix to eliminate twist errors associated with differences in strain/temperature response. Third, a second-order shape sensing matrix is generated which includes the additional (e.g., a $5^{th}$) temperature measurement term to better characterize the full response of the fiber, including the interdependence of first-order and second-order strain, temperature, twist, and curvature. Fourth, the second-order shape matrix is calibrated using a robust matrix method with 2n stimulus vectors $s_i$ that produce combined stimulus vectors $[s_i \; s_i^2]$ that are linearly independent. Fifth, an advantageous example embodiment uses a pre-computed approximation to the inverse of the Jacobian matrix of the second-order shape equations over all stimulus values of interest in order to facilitate accurate real-time solution of those equations. This computation may be applied as a single update to the first-order solution.

Example embodiments of a fiber-based sensing system include a combined sensor that independently measures temperature, strain, and its own 3D shape and position. This sensor may be applied as a self-localized strain and/or temperature sensor. The technical features used in the shape sensing system can further be expanded to various embodiments of the shape sensing system which require varying degrees of processing while still allowing for higher accuracy shape sensing.

Example embodiments also provide a passive approach to temperature compensation through design of the fiber's optical properties during the manufacturing stage. One example aspect includes the tuning of an optical path ratio, by either fiber optical core design or selection of optimal sensing triad, to minimize twist response to either temperature or strain, or to make the twist response corresponding to an optical frequency shift due to either temperature or strain be equal so the twist error can be compensated for without necessarily knowing if the optical frequency shift is caused by temperature or strain. Another example aspect includes calibration of a shape sensing matrix to account for non-minimized temperature or strain response.

Example embodiments also provide alternative methods of nonlinear shape matrix calibration and shape calculation including calibration of the nonlinear shape matrix by using small stimuli to minimize the nonlinear response of selected terms and isolate the response of others. Another example aspect includes application of the nonlinear shape matrix during shape computation using Newton's method, and in one example implementation, with a small fixed number of iterations.

Optical Frequency-Domain Reflectometry (OFDR)

OFDR is highly effective at performing high resolution distributed measurements of a light scattering profile along the length of a waveguide (e.g., an optical fiber core). Scattering of light along the waveguide is related to the local index of refraction at a given location. Two consecutive measurements can be compared to detect local changes of index of refraction along the length of the waveguide by detecting changes in the scattering profile. These changes can be converted into a distributed measurement of strain, temperature, or other physical phenomena.

FIG. 1 is a non-limiting example setup of an OFDR system 10 used to monitor local changes of index of refraction along the length of a fiber optic sensor 22 useful in one or more measurement and/or sensing applications. In some applications, the fiber optical sensor 22 functions as a sensor, and in other applications, it may be a device under test (DUT) or other entity. A tunable laser source (TLS) 12 is swept through a range of optical frequencies. This light is split with the use of one or more optical couplers and routed to two sets interferometers 14 and 16. One of the interferometers is an interferometric interrogator 16 which is connected to the sensing fiber 22. This interferometer 16 may have multiple sensing channels (e.g., 4 are depicted in FIG. 1), each of which may correspond to a separate single-core fiber or an individual core of a multi-core optical fiber (e.g., a 7-core shape sensing fiber is depicted in FIG. 1). Light enters the each sensing fiber/core through a measurement arm of the interferometric interrogator 16. Scattered light along the length of the fiber is then interfered with light that has traveled along the corresponding reference arm of the interferometric interrogator 16.

The other interferometer within a laser monitor network 14 measures fluctuations in the tuning rate as the light source scans through a frequency range. The laser monitor network 14 also contains an absolute wavelength reference, such as a Hydrogen Cyanide (HCN), gas cell, which is used to provide absolute optical frequency reference throughout the measurement scan. A series of optical detectors converts detected light signals from the laser monitor network, HCN gas cell, and the interference pattern from the sensing fiber into electrical signals for data acquisition circuitry 18. A system controller data processor 20 uses the acquired electrical signals from the data acquisition circuitry 18 to extract a scattering profile along the length of the sensor 22 as is explained in more detail in conjunction with FIG. 2.

Figure 2:
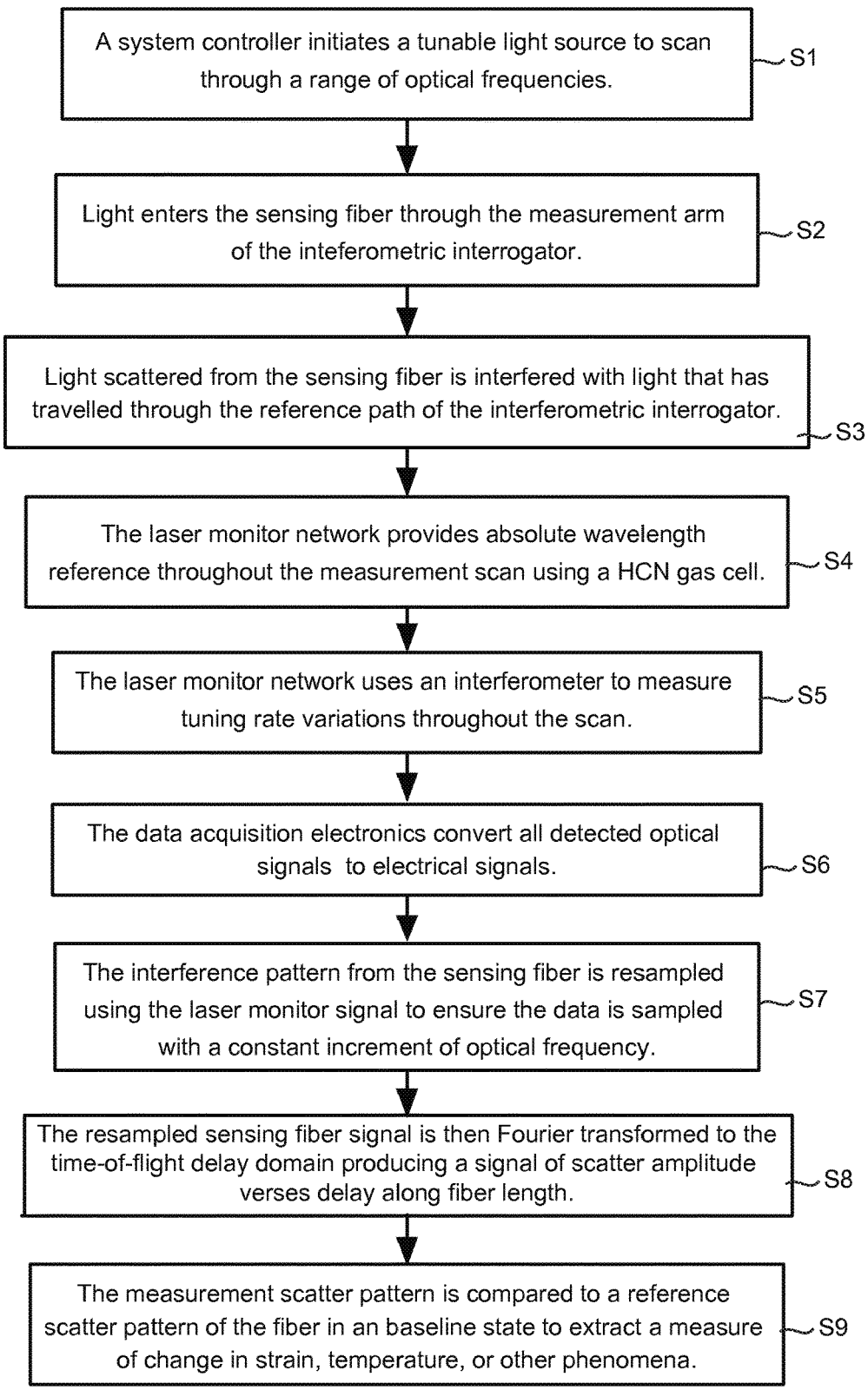
FIG. 2 is a flowchart illustrating example OFDR distributed measurement and processing procedures.

FIG. 2 is a flowchart diagram of non-limiting, example distributed measurement procedures using an OFDR system like 10 shown in FIG. 1. In step S1, the tunable light source is swept through a range of optical frequencies and directed into the sensor via the measurement arm of the interferometric interrogator (step S2). Scattered light along the length of the sensor interferes with light that has traveled through the reference path of the interferometric interrogator (step S3). An absolute wavelength reference is provided for the measurement scan (step S4), and tuning rate variations are measured (step S5). Optical detectors convert detected optical signals into electrical signals (step S6) for processing by the data processor. The equation below gives a mathematical representation of the interference signal x(t) associated with a point reflector at time-of-flight delay $\tau_s$, relative to the reference arm of the interferometer, as received at the detector. A is the amplitude of the received interference signal. The frequency scan rate of the TLS is denoted by dv/dt, where v represents the laser's frequency and t represents time. The variable $\phi$ accounts for the initial phase offset between the two signal paths in the OFDR interferometer.

$$x(t) = A\cos\left[2\pi\frac{dv}{dt}\tau_s \cdot t + \phi\right] \quad (1)$$

The interference pattern of the sensing fiber is preferably resampled using the laser monitor signal to ensure the detected signals are sampled with a constant increment of optical frequency (step S7). Once resampled, a Fourier transform is performed to produce a sensor scatter signal in the time-of-flight delay domain. In the delay domain, the scatter signal depicts the amplitude of the scattering events as a function of delay along the length of the sensor (step S8).

Both applied strain and temperature change induce changes in the fiber's measurement state. As the sensing fiber is strained, local scatters shift as the fiber changes in physical length. Due to the thermo-optic effect, temperature variations directly induce changes in the fiber's refractive index. These changes are in addition to the physical length change associated with thermal expansion, and both effects cause the apparent spacing of local scatterers to shift in a manner indistinguishable from the strain effect described above.

It can be shown that these shifts are highly repeatable. Hence, an OFDR measurement can be retained in memory that serves as a "baseline" reference of the unique pattern of the fiber in a characteristic state, e.g., static, unstrained, and/or at a reference temperature. A subsequent measurement can be compared to this baseline pattern to gain a measure of shift in delay of the local scatters along the length of the sensing fiber. This shift in delay manifests as a continuous, slowly varying optical phase signal when compared against the reference scatter pattern. The derivative of this optical phase signal is directly proportional to differential change in physical length of the sensing core. Differential change in physical length can be scaled to strain or temperature producing a continuous measurement of strain or temperature along the sensing fiber (step S9).

Shape and Position Sensing in Multi-Core Optical Fiber

Figure 3A:
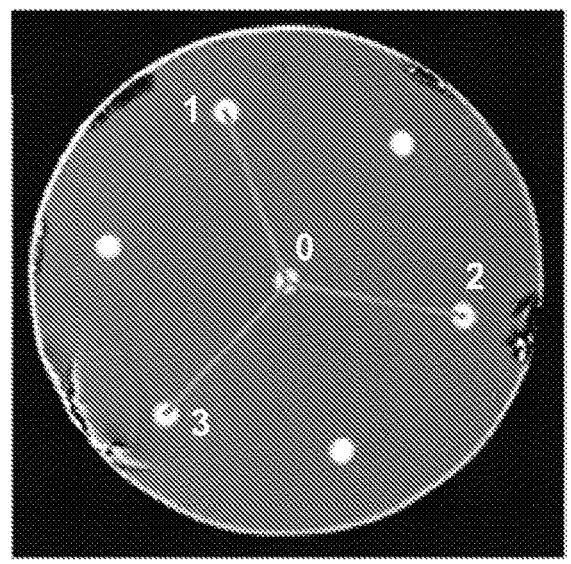
FIGS. 3A-3C show an example embodiment of a multi-core fiber with a strain response shown for four of the cores.
Figure 3B:
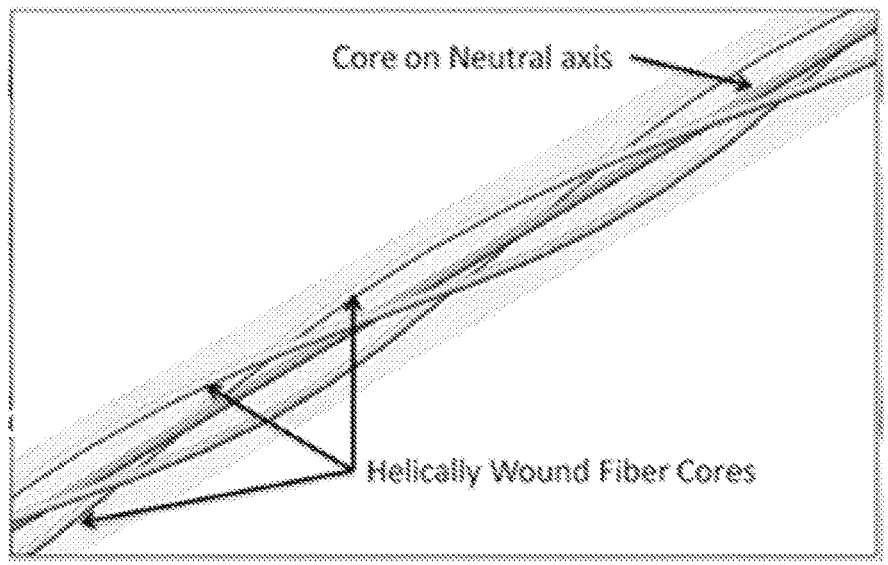

A fiber optic shape sensing system, as described in U.S. Pat. No. 8,773,650, uses a multi-core optical fiber to transduce change in physical shape to distributed strain. FIG. 3A shows an example embodiment manufactured with seven distinct optical cores: one center core along the central axis of the cylindrical fiber and 6 outer cores located at a constant radius and even angular spacing from this axis. As shown FIG. 3B, the 7-core fiber is twisted during manufacture, introducing a fixed intrinsic helical pattern among the outer cores. Because the center core is on the neutral twist axis, it is not affected by the twisting during manufacture. In this example embodiment, in addition to the center core, three of the outer cores are typically interrogated; this "sensing triad" is marked in FIG. 3A as 0-3.

Under curvature, each the outer cores experience a local state of tension or compression based on its location relative to the direction of the applied bending moment. Because the fiber is helixed, each of the outer cores oscillates from tension to compression as it traverses back and forth between the outside and inside of the bend. In practice, the typical intrinsic helix pitch is made to be sufficiently short to generate multiple periods of strain oscillation in a curve. The center core is situated on the neutral bending axis and experiences negligible strain due to curvature.

Figure 3C:
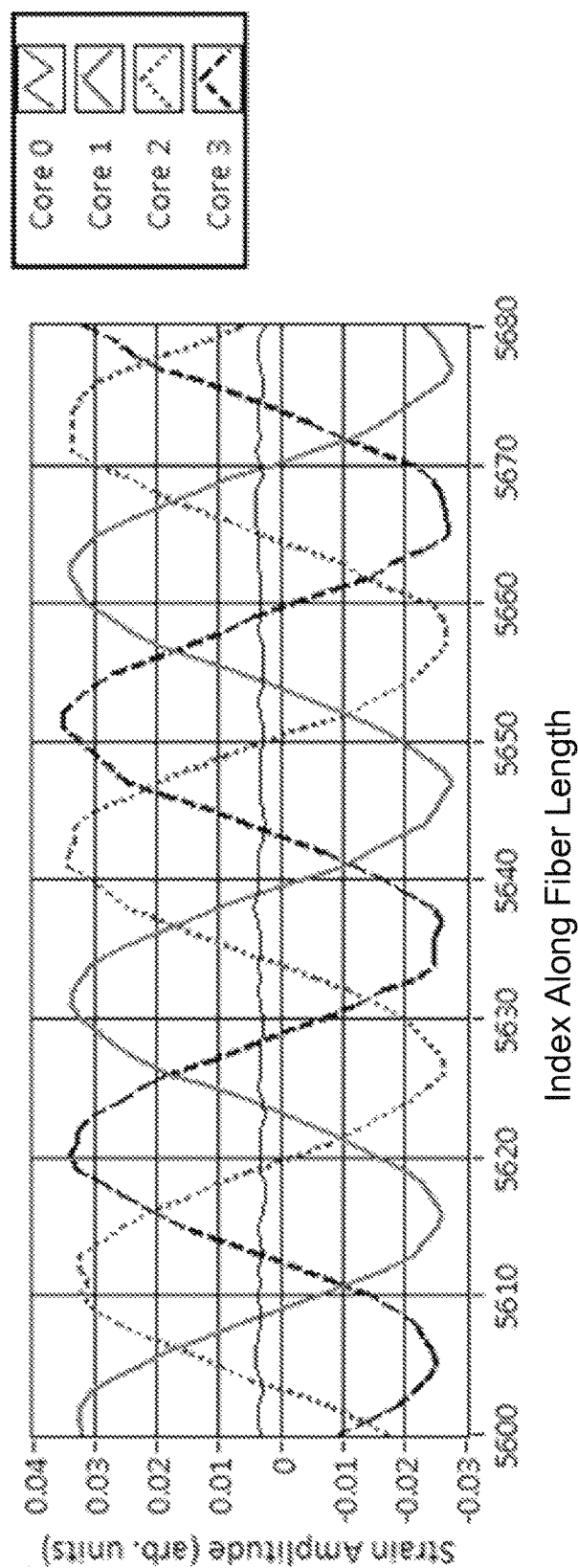

The helical path of the outer cores renders them responsive to extrinsically-applied twist. Under a twisting moment, all of the outer cores experience a common tension or compression, depending on whether the twist is applied in the same or opposite direction as the helix. The central core is situated on the neutral twist axis and experiences negligible strain due to extrinsic twist. FIG. 3C shows a graph of strain response to external curvature along a length of the fiber for cores 0-3.

All sensing cores are affected by axial strain and changes in temperature. The center core, being insensitive to twist and curvature, is designed to compensate for these phenomena by providing a measurement of temperature/strain that is independent from fiber shape. This combined temperature/strain compensation may be used to generate shape measurements with better than 1% by length accuracy under laboratory conditions.

Temperature/Strain-Induced Errors

Because the fiber's Rayleigh or Bragg scatter fingerprint is sensitive to both temperature and strain, the fiber optic sensing mechanisms described herein are subject to cross-sensitivity error. For example, a single-core fiber designed to measure temperature will report a false reading if subjected to an unknown state of strain. Likewise, strain-measurement sensors are unable to distinguish the difference between deformation of the substrate to which they are bonded and the temperature-induced change in refractive index within the fiber.

Figure 4A:
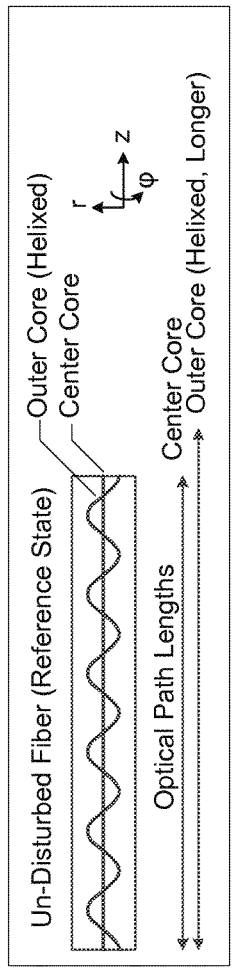
FIGS. 4A-4D show how changes in temperature and changes in the fiber's axial strain state exert different effects on the shape measurement.
Figure 4B:
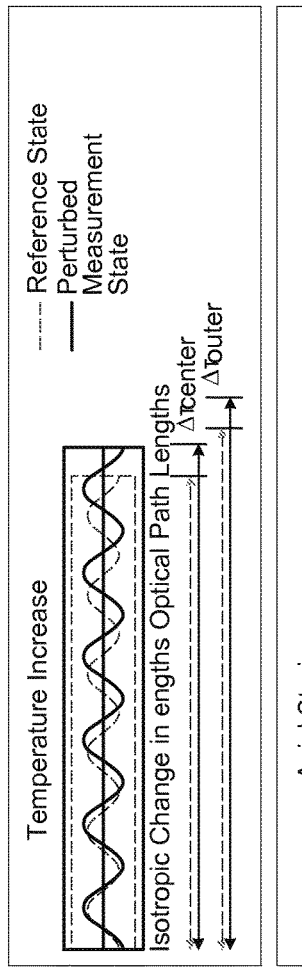

In multi-core shape sensing, the use of the central core as described in U.S. Pat. No. 8,773,650 corrects for the most significant effects of strain and temperature on the fiber's response. However, there is a secondary effect in which changes and temperature and changes in the fiber's axial strain state exert different effects on the shape measurement. This effect, illustrated in FIGS. 4A-4D, is primarily a result of the differences in the path of the outer and central cores inside the fiber. The center core is aligned along the z-axis of the cylindrical optical fiber. The outer cores traverse a helixed path, which means that the vector direction of each outer core contains components in both the z and y directions. FIG. 4A shows that, for a given length of fiber, the helical outer cores traverse a slightly longer path than the central core.

Because of the nature of the thermo-optic effect and thermal expansion, temperature changes act isotropically in the fiber. Ideally, under increased temperature, the outer cores, which travel a different path than the center cores, experience the same amount of length extension as the center core, relative to their optical path lengths. See FIG. 4B. This relative length extension is measured using OFDR sensing as an apparent strain/temperature change. In practice, very small differences in the doping levels of each core may cause their index of refraction and optical path length response to temperature to vary slightly.

Figure 4C:
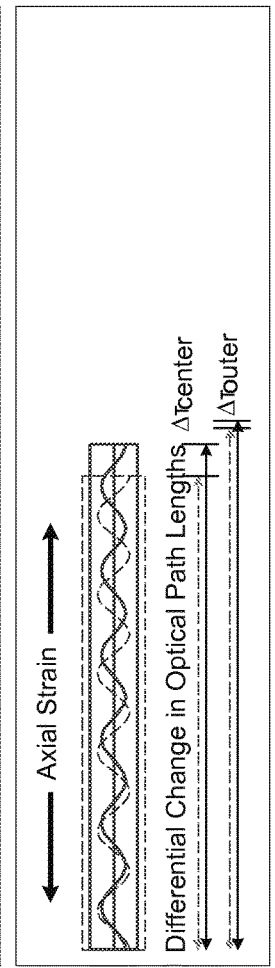
Figure 4D:
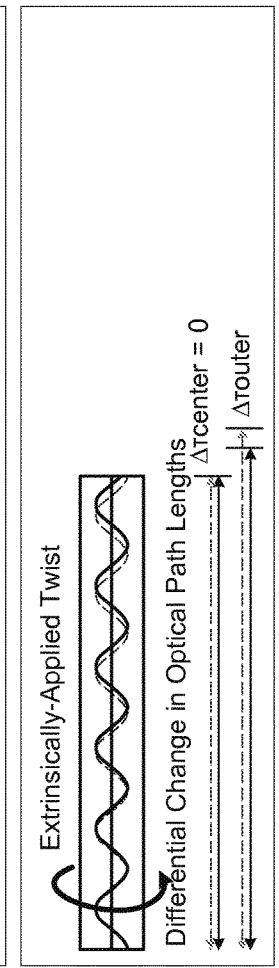

The effects of z-axis ("axial") strain are directional. Because each outer cores has a vector component in the φ-direction, only a fraction of the applied strain translates to an extension of the outer core's optical path. In addition, the Poisson effect results in a shrinking of the fiber's radius under axial tension, further reducing the outer cores' response to axial strain relative to the central core. Therefore, unlike temperature changes, strain changes produce a clear differential strain response between the outer cores and the central core as shown in FIG. 4C. Because of the small diameter and relative shallowness of the helix pitch, this effect is small but measurable in a typical shape sensing fiber.

Extrinsically-applied twist generates the same kind of differential strain response between the outer and the central cores. See FIG. 4D. As described above, the φ-component of the outer cores' path renders the optical path length sensitive to twist, whereas the central core is not. A shape measurement algorithm determines twist as the average change in outer core path length subtracted from that of the center core, at each point in the fiber. Any such response is registered as extrinsic twist. Therefore, the portion of the response to axial strain which is not common between the center and outer cores is falsely registered as a twist signal. Minor differences in the index of refraction response to temperature between the outer and center cores may register as a false twist signal. This false twist measurement directly contributes to error in the resulting shape measurement.

Thermal Compensation Via Additional Measurement Core

The errors described above can be eliminated if the temperature and axial strain stimuli can be resolved (distinguished) and compensated separately in the OFDR sensor measurement data. To enable this resolution/distinction, another core in the optical fiber is used to produce an additional spectral shift measurement. If this core has a different response to temperature, it can be used in a differential measurement with the one or more of the other cores to resolve temperature and strain independently.

Figure 5:
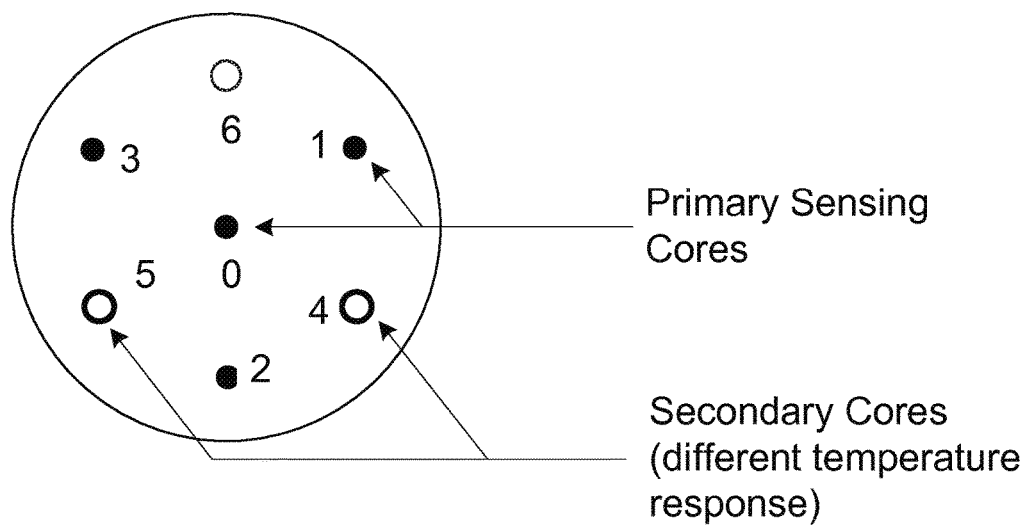
FIG. 5 illustrates a 7-core fiber with four primary cores and three secondary cores.

In this description, one or more sensing cores are described as the primary set of core(s), and another set of one or more cores are described as the secondary core(s). FIG. 5 illustrates a 7-core fiber with four primary cores and three secondary cores. The primary and secondary sets of cores differ in their response to temperature, but may also exhibit other differences. This response to stimuli includes changes in measured backscatter reflection spectrum and/or time-of-flight delay in an optical core as a result of changes in external phenomena or stimuli, such as temperature or strain.

Tailored Response Through Dopant Concentration

Figure 6B:
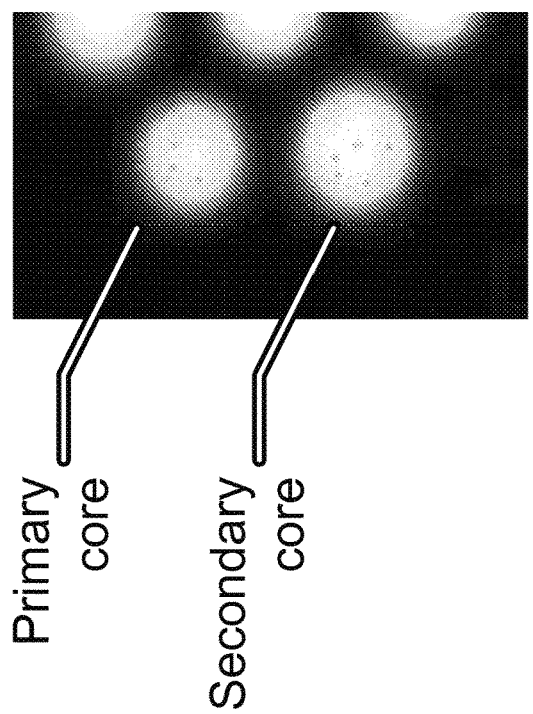
FIGS. 6A and 6B show end-face images of a multi-core fiber produced with two sets of dissimilar cores.
Figure 6A:
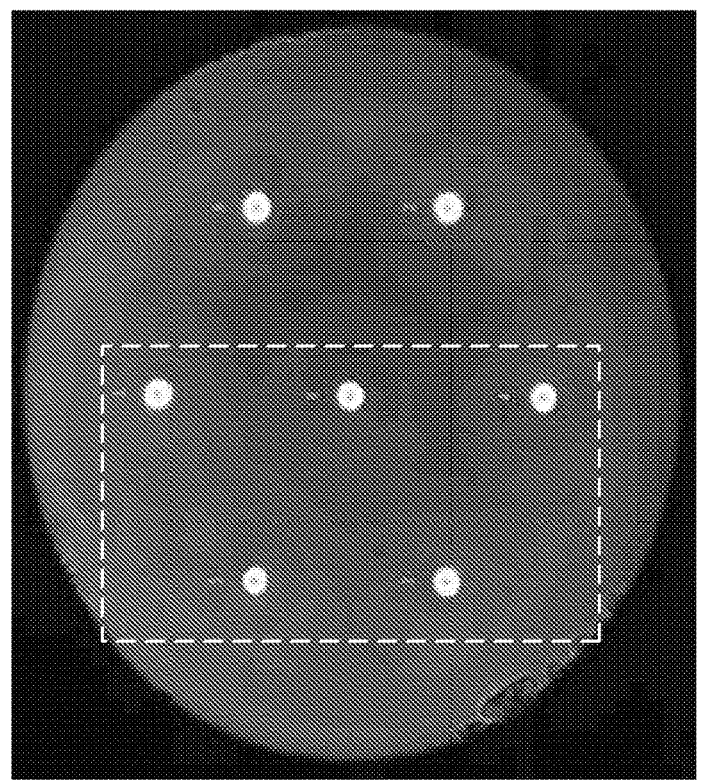

A more highly Germanium-doped fiber has a stronger temperature response than low bend loss (LBL) cores used in many sensing fibers, including shape sensing fibers. LBL fiber contains approximately 5% Ge doping in the core, whereas high-Ge fiber may contain over 15% Ge doping. Other dopants, such as Boron or Fluorine, may also be used to produce a different temperature response. Changes in the strain sensitivity resulting from dopant changes are expected to be substantially smaller between dopant types because strain response is dominated by the effective scatter event period change (stemming from Rayleigh scatter or Bragg grating) rather than the strain-optic induced change in the refractive index and are thus much less sensitive to differences in strain-optic coefficients caused by dissimilar doping. FIGS. 6A and 6B show end-face images of a multi-core fiber produced with two sets of alternately-doped cores. The secondary cores contain a higher level of Germanium dopant (8% v. 5%) and have a higher numerical aperture, and are therefore visibly larger as seen in FIG. 6B.

Figure 7:
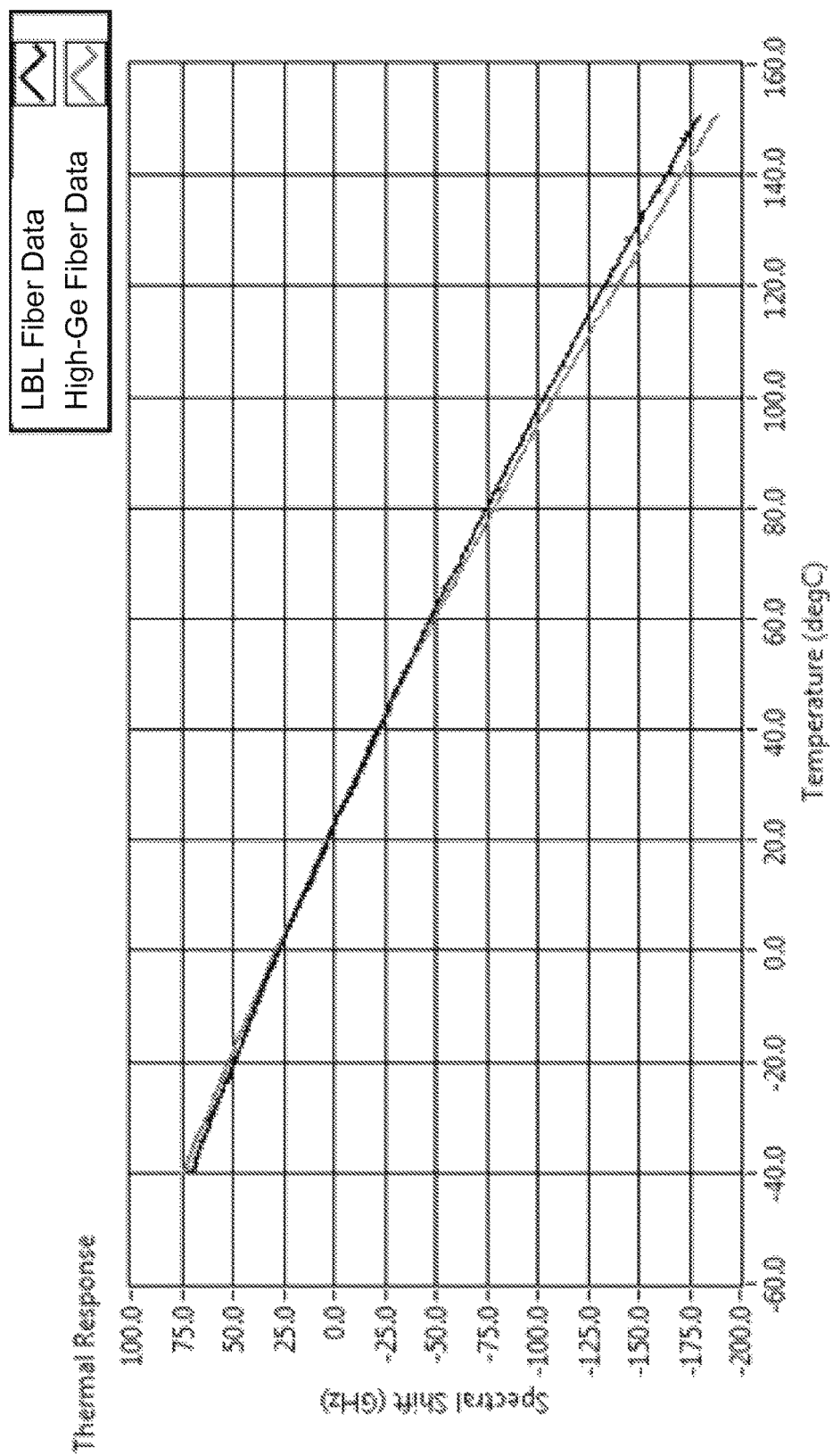
FIG. 7 illustrates a graph of an example measured thermal response difference between commercially-available Low Bend Loss (approximately 5% Ge content) and highly-doped (17% Ge content) fibers.

FIG. 7 is a graph illustrates an example measured thermal response difference between commercially-available LBL (approximately 5% Ge content) and higher-doped (17% Ge content) fiber cores. A second-order polynomial fit is applied to the data, and the fitted spectral shift response functions $\Delta v_{LBL}$ and $\Delta v_{Ge}$ are shown in the equations below. As seen in FIG. 7, the high-Ge fiber response curve has a steeper slope, and thus exhibits a stronger first-order (linear) response by approximately 4.8% (−1.210 vs −1.155 GHz/° C.).

$$\Delta v_{LBL} = 26.78 \text{ GHz} + (-1.155 \text{ GHz/° C.})\Delta T + (-0.001464 \text{ GHz/° C.}^2)(\Delta T)^2$$

$$\Delta v_{Ge} = 28.39 \text{ GHz} + (-1.210 \text{ GHz/° C.})\Delta T + (-0.001549 \text{ GHz/° C.}^2)(\Delta T)^2 \quad (2)$$

Application to Strain and/or Temperature Sensors

In one example embodiment, a single primary core and single secondary core are interrogated. Alternatively, the 7-core fiber shown in FIGS. 5 and 6 can be operated in this manner by selecting only two of the available cores for sensing. The linear responses of the $m^{th}$ core to temperature and strain are described by $K_T^{(m)}$ and $K_\varepsilon^{(m)}$, respectively. In the case of differently-doped cores, as described above, each core's strain response is expected to be nearly equal, and is described by a single variable IQ for the purpose of illustration. During sensing, the spectral shift $\Delta v_m$ measured in each sensing core is determined by contributions from both the strain and temperature response. This can be described by a system of sensor response equations with two inputs: applied strain $\varepsilon$ and temperature change $\Delta T$. Using a linear model, this system of sensor response equations is described in matrix form below.

$$\begin{bmatrix} \Delta v_0 \\ \Delta v_1 \end{bmatrix} = \begin{bmatrix} K_\varepsilon & K_T^{(0)} \\ K_\varepsilon & K_T^{(1)} \end{bmatrix} \begin{bmatrix} \varepsilon \\ \Delta T \end{bmatrix} \quad (3)$$

If the spectral shifts or responses $\Delta v_m$ for each core are measured, and the linear responses of the $m^{th}$ core to temperature and strain described by $K_T^{(m)}$ and $K_\varepsilon^{(m)}$ are known, then the above 2×2 matrix may be inverted to solve for the two unknown variables $\varepsilon$ and $\Delta T$:

$$\begin{bmatrix} \varepsilon \\ \Delta T \end{bmatrix} = A^{-1} \begin{bmatrix} \Delta v_0 \\ \Delta v_1 \end{bmatrix}, \text{ with } A = \begin{bmatrix} K_\varepsilon & K_T^{(0)} \\ K_\varepsilon & K_T^{(1)} \end{bmatrix} \quad (4)$$

In this way, strain and temperature can be determined independently and distinguished from each other.

Figure 8:
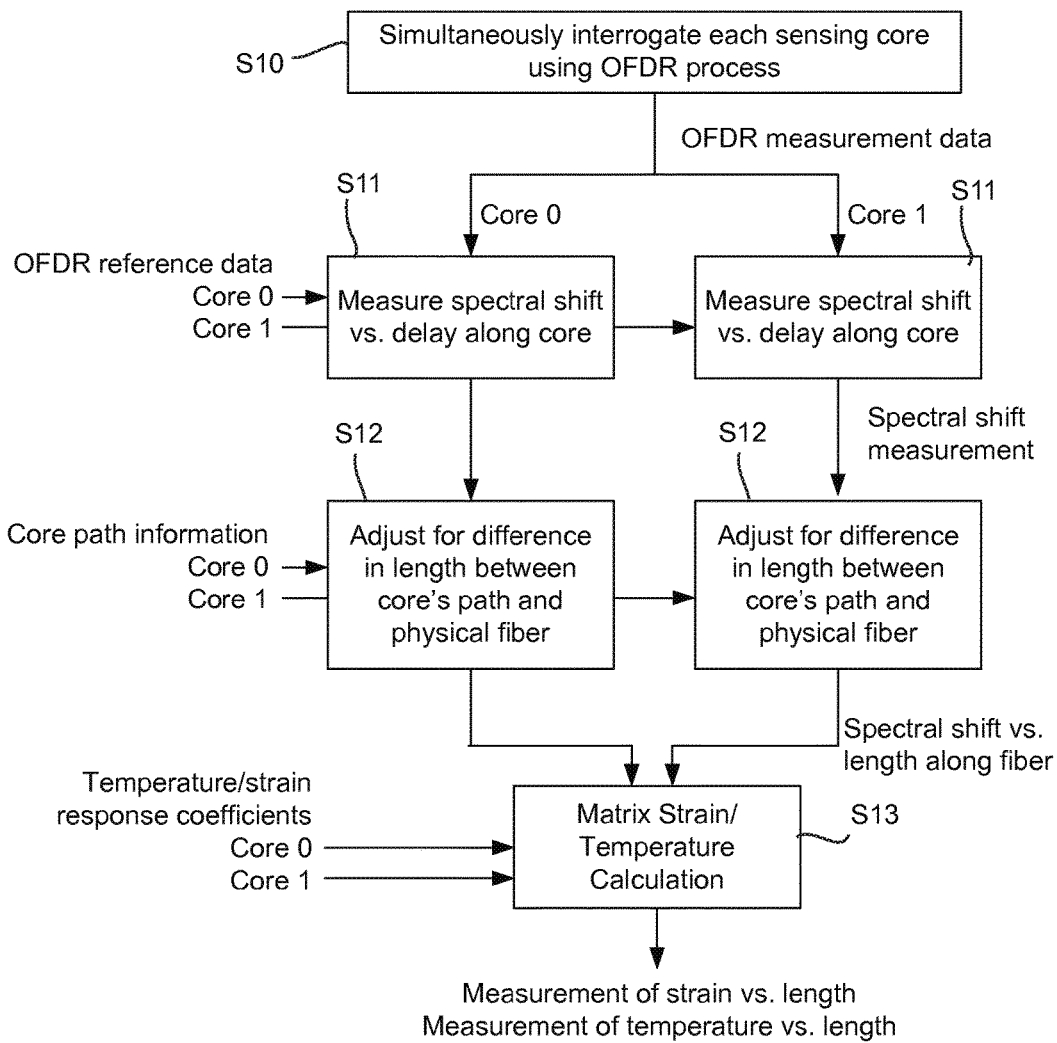
FIG. 8 is a flowchart illustrating example OFDR distributed measurement and processing procedures for interrogating each sensing core in accordance with an example embodiment.

A flowchart of example procedures for a measurement process for this embodiment is outlined in FIG. 8. Data is collected simultaneously on each sensing core (step S10) using the OFDR system shown in FIG. 1 and the data collection process described in FIG. 2. OFDR measurement data is compared with the pre-measured reference data arrays for each individual sensing core. This results in a measurement of spectral shift vs. time-of-flight delay along each sensing core (step S11). Information about the fiber's geometry predetermined and stored in memory is used to adjust for differences in the optical path length of each core for a given length of physical fiber (step S12). For example, this adjustment may be performed by interpolating the measured spectral shift data to produce two data arrays which are in alignment and represent measured spectral shift at locations along the length of the physical fiber itself. The determined spectral shifts $\Delta v_m$ measured for each core, along with the temperature and strain coefficients for each core $K_T^{(m)}$ and $K_\varepsilon^{(m)}$, which are pre-calibrated and pre-stored in memory, are used to calculate the two variables $\varepsilon$ and $\Delta T$. This calculation is performed at each measured location along the fiber and converts the measurement of spectral shift in each core to an output measurement of temperature and strain observed by the fiber (step S13).

The resolution with which temperature and strain may be resolved is dependent on the differences in responses of the primary and secondary sensing cores and on the system noise level. A noise model constructed based on Equation 3 estimates the uncertainty in the strain and temperature results for a given uncertainty in the measured spectral shifts $\Delta v_m$ and given a specific difference in the temperature coefficients for each core $K_T^{(m)}$. This model uses an example but typical value of $K_\varepsilon = -0.15$ GHz/µε. The measured values of the thermal response from the above example are used: $K_T^{(0)} = -1.1547$ GHz/° C. and $K_T^{(1)} = -1.2100$ GHz/° C. Assuming a typical RMS spectral shift measurement noise of $\delta v_{RMS} = 0.1$ GHz, the resulting output RMS measurement noise of temperature and strain are simulated to be 20µε and 2.6° C., respectively. This example sensing core thermal response difference may be sufficient for many general-purpose sensing applications.

Assuming the values above for $K_\varepsilon$, $K_T^{(0)}$, and RMS spectral shift measurement noise, the above sensitivity analysis can be run for multiple values of $K_T^{(1)}$. This simulates the effects of different levels of dopant in the secondary sensing core(s). The results are shown in the table below. From this model, it is determined that the minimum practical difference between $K_T^{(1)}$ and $K_T^{(0)}$ is approximately 2%. This is sufficient for general-purpose sensing which requires a temperature measurement uncertainty of better than 50µε and strain uncertainty of better than 10° C.

| Difference between $K_T^{(1)}$ and $K_T^{(0)}$ | Strain Uncertainty (µε RMS) | Temperature Uncertainty (° C. RMS) |
| --- | --- | --- |
| 2% | 48 | 6.2 |
| 5% | 19 | 2.4 |
| 8% | 12 | 1.5 |
| 10% | 10 | 1.3 |

Example Implementation of Strain and/or Temperature Sensor

The strain c referred to in Equation 3 may stem from a variety of physical mechanisms. U.S. Pat. No. 8,773,650 describes strain on a core in a multicore fiber arising from three physical sources: strain applied along the axis of the fiber, strain due to fiber bending, and strain due to an applied twist. The core strain response to applied twist rate given by applied twist angle θ applied over length L is dependent on the core radius to the central axis r and the fiber's intrinsic twist period p, and to first order is given by the expression:

$$\varepsilon_{twist} \approx \frac{2\pi r^2 p}{p^2 + (2\pi r)^2} \frac{\theta}{L} \quad (5)$$

Transfer of fiber axial strain $\varepsilon_z$ to the core is dependent on the core radius r, the intrinsic twist period p, and the fiber material's Poisson ratio η, and to first order is given by the expression:

$$\varepsilon_{tension} \approx \frac{p^2 - (2\pi r)^2 \eta}{p^2 + (2\pi r)^2} \varepsilon_z \quad (6)$$

The core strain in response to bending is dependent on the core radius r, intrinsic twist period p, the fiber material's Poisson ratio η, the curvature about the x and y axis $\kappa_x$ and $\kappa_y$, distance along the fiber axis z, and the orientation angle of the $n^{th}$ core in the plane perpendicular to the fiber axis $\phi_n$ is to first order is given by the expression:

$$\varepsilon_{bend} \approx \frac{p^2 - \eta(2\pi r)^2}{p^2 + (2\pi r)^2} \left( k_x r \sin\left(\frac{2\pi z}{p} + \varphi_n\right) + k_y r \cos\left(\frac{2\pi z}{p} + \varphi_n\right) \right) \quad (7)$$

Since the fiber is described to have an intrinsic twist state imposed during manufacturing, the strain response to bending in a plane will be sinusoidal as a function of the sensor length, although in practice intrinsic helix period p may vary slightly with the fiber axial position z. Generally, temperature and strain are monitored as some difference between reference and measurement states.

In the simplest and most frequently encountered embodiment, the sensor fiber is secured to a test object such that the applied twist state and shape of the fiber do not change between the reference and measurement state, so only the fiber axial strain and temperature vary. In this case, the strain E referred to in Equation 3 is given by the expression in Equation 6. Making the substitution, Equation 3 can be rewritten.

$$\begin{bmatrix} \Delta v_0 \\ \Delta v_1 \end{bmatrix} = \begin{bmatrix} K_\varepsilon \frac{p^2 (2\pi r_0)^2 \eta}{p^2 + (2\pi r_0)^2} & K_T^{(0)} \\ K_\varepsilon \frac{p^2 - (2\pi r_1)^2 \eta}{p^2 + (2\pi r_1)^2} & K_T^{(1)} \end{bmatrix} \begin{bmatrix} \varepsilon_z \\ \Delta T \end{bmatrix} \quad (8)$$

The subscript on the core radius r emphasizes that the primary and secondary cores may have a different radius to the fiber center. This equation can be solved for the axial strain $\varepsilon_z$ and the temperature change ΔT by inverting the 2×2 matrix, as demonstrated in Equation 4. As long as the two cores are selected to have different doping so as to have a different temperature response, separation of axial strain and temperature is generally achieved as described in FIG. 8.

In another example embodiment, the fiber sensor is secured in such a way that axial strain and shape changes are not imparted, but a twist is applied to the sensor fiber. In this case, so long as the primary and secondary cores have a differing temperature response and the cores have different radii to the center axis (ie. one center core and one outer core), the strain will be due to the applied twist as described in Equation 5. Equation 5 can be combined with Equation 3, and both applied twist and temperature may found following the procedure outlined in FIG. 8.

In another example embodiment, the fiber sensor is secured in such a way that axial strain and applied twist are not imparted, but the sensor fiber formed in a shape in a plane. In this case, so long as the primary and secondary cores have a differing temperature response and both cores are not along the fiber center axis, the strain determined in Equation 4 will be due to the bending strain as described in Equation 7. Equation 7 can be combined with Equation 3, and both curvature in a plane and temperature may both be measured following the procedures outlined in FIG. 8.

In the event that the sensor is secured to a test object such that temperature plus more than on other parameter (axial strain, applied twist, curvature in x, curvature in y) may vary, the procedure described above may be altered to incorporate more variables and more sampled cores. For example, simultaneous measurement of temperature, axial strain, and applied twist would require measuring the distributed optical frequency shift of 3 cores, and the equations described in Equation 3 would expand to 3, and the matrix inversion described in Equation 4 would be of a 3×3 matrix. Similarly, simultaneous measurement of temperature plus 3 of the above parameters would require measuring the spectral shift of 4 cores, and performing an inversion of a 4×4 matrix. In preferred example embodiments, core choice may be guided by the following. To observe temperature, at least two cores with different temperature responses should be selected. To observe applied twist, two cores with different radii r should be selected. To observe curvature, at least one core must be off the central axis. To observe curvature in orthogonal planes, two cores off the center axis and not in a line through the center axis should be selected.

Analysis of the strain signal frequency with sensor length could also be used to discriminate between strains stemming from applied twist or axial strain and strain stemming from curvature, and thus, it is possible to record spectral shifts from only two cores and discriminate temperature from curvature strain plus either applied twist strain or axial strain. Strains due to curvature are modulated by a sinusoid at the intrinsic twist frequency as shown in Equation 7. Strains due to axial strain or applied twist may not have significant content at spatial frequencies near the helix frequency. Thus it is possible to measure curvature in orthogonal directions $K_x$ and $K_y$ and also measure temperature and axial strain (or applied twist) with data from only two cores, if there are limits on the spatial frequency content of the signals.

Figure 9:
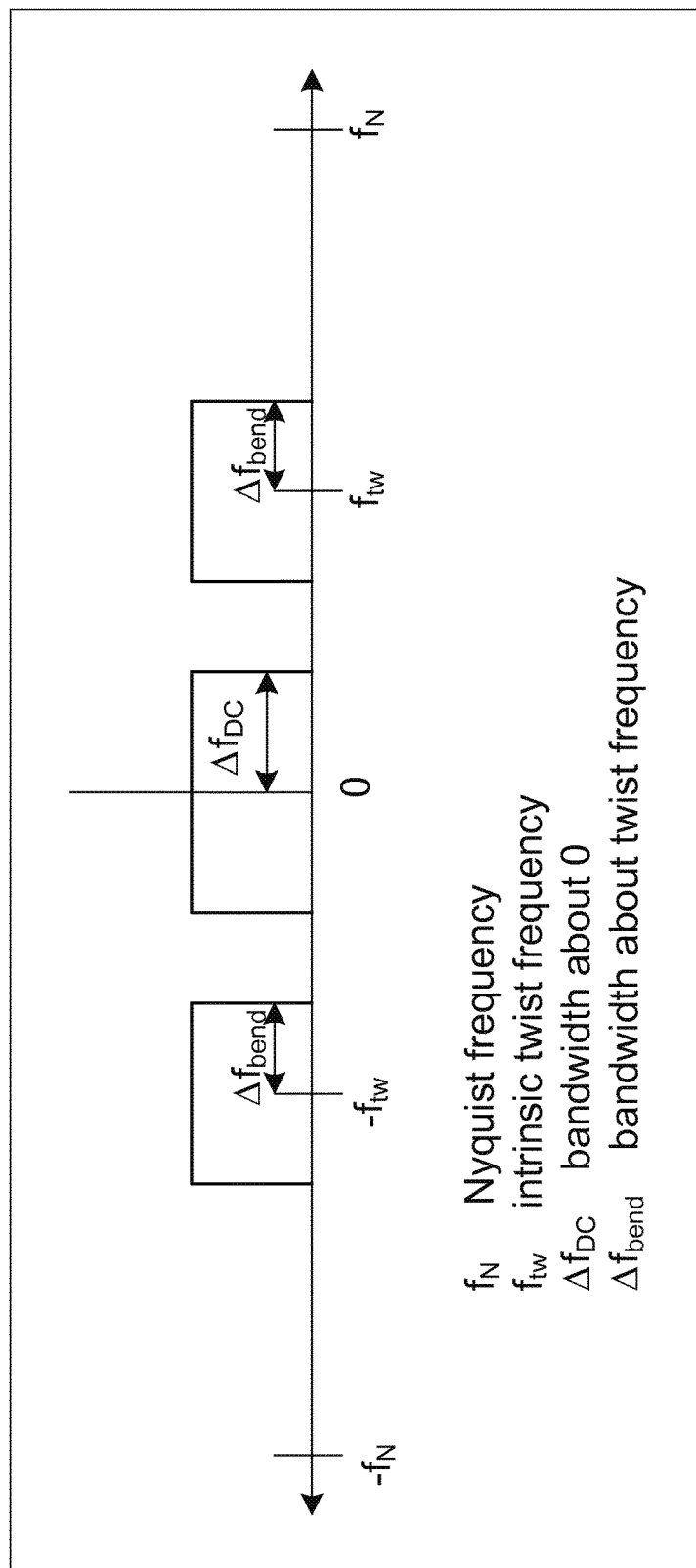
FIG. 9 illustrates how strain response to curvature is periodic along the length of the fiber because it is modulated by the intrinsic twist rate and how the response to temperature, axial strain, and applied twist do not necessarily have the same periodic nature, which means the signals may be separated by spatial frequencies.

FIG. 9 illustrates the concept of separating strain signals by spatial frequencies. Spectral shift data along the fiber length is transformed to the spatial frequency domain by a Fourier transform. Data near 0 frequency (encompassing the temperature and axial strain or applied twist response) and near the intrinsic twist frequency (encompassing the curvature response) is windowed, separated and transformed back to the spatial extent domain by an inverse Fourier transform. In this manner, axial strain (or applied twist) and temperature distributions with spatial frequency content within the spatial frequency bandwidth $\Delta f_{DC}$ could be separated from curvature distributions with spatial frequency content within the spatial frequency bandwidth $\Delta f_{bend}$. The data content for two separate cores near 0 spatial frequency could then be further separated into axial strain (or applied twist) and temperature as described in FIG. 8 and Equation 8. Curvature in orthogonal directions could be distinguished by separating out signal content near spatial frequency $f_{tw}$ for two cores and using a similar 2×2 matrix as described Equations 3-4 and in FIG. 8, so long as two outer cores have orientation angles $\phi_1$ and $\phi_2$ that differ by neither 0° nor 180°.

Example Application to Shape Sensors

The following shape sensing fiber description is provided as a specific example of adding an additional measurement core having different optical properties. In the canonical shape sensing calculation, the computation of axial strain/temperature $\varepsilon_z$, x and y curvature $\kappa_x$, $\kappa_y$, and twist $\theta/L$ is performed using a 4×4 matrix calculation, as shown below. A total of 16 linear scaling terms are used to calculate these outputs from the phase derivative or spectral shift OFDDR measurements $\Delta v_n$ in each of the four sensing cores.

$$\begin{pmatrix} \Delta v_0 \\ \Delta v_1 \\ \Delta v_2 \\ \Delta v_3 \end{pmatrix} = \begin{pmatrix} M11 & M12 & M13 & M14 \\ M21 & M22 & M23 & M24 \\ M31 & M32 & M23 & M34 \\ M41 & M42 & M43 & M44 \end{pmatrix} \begin{pmatrix} \varepsilon_z \\ K_x \\ K_y \\ \theta/L \end{pmatrix} \quad (9)$$

In an example shape sensing embodiment, a differently-doped core is included in the fiber (e.g., from one of three previously unused cores) and added as a fifth measurement term which is used to distinguish temperature change $\Delta T$ from axial strain $\varepsilon_z$. This example sensing fiber is illustrated in FIGS. 5 and 6A, 6B. Additional scaling terms are added to bring the matrix to 5×5.

$$\begin{pmatrix} \Delta v_0 \\ \Delta v_1 \\ \Delta v_2 \\ \Delta v_3 \\ \Delta v_4 \end{pmatrix} = \begin{pmatrix} M11 & M12 & M13 & M14 & M15 \\ M21 & M22 & M23 & M24 & M25 \\ M31 & M32 & M23 & M34 & M35 \\ M41 & M42 & M43 & M44 & M45 \\ M51 & M52 & M53 & M54 & M55 \end{pmatrix} \begin{pmatrix} \varepsilon_z \\ K_x \\ K_y \\ \theta/L \\ \Delta T \end{pmatrix} \quad (10)$$

Figure 10:
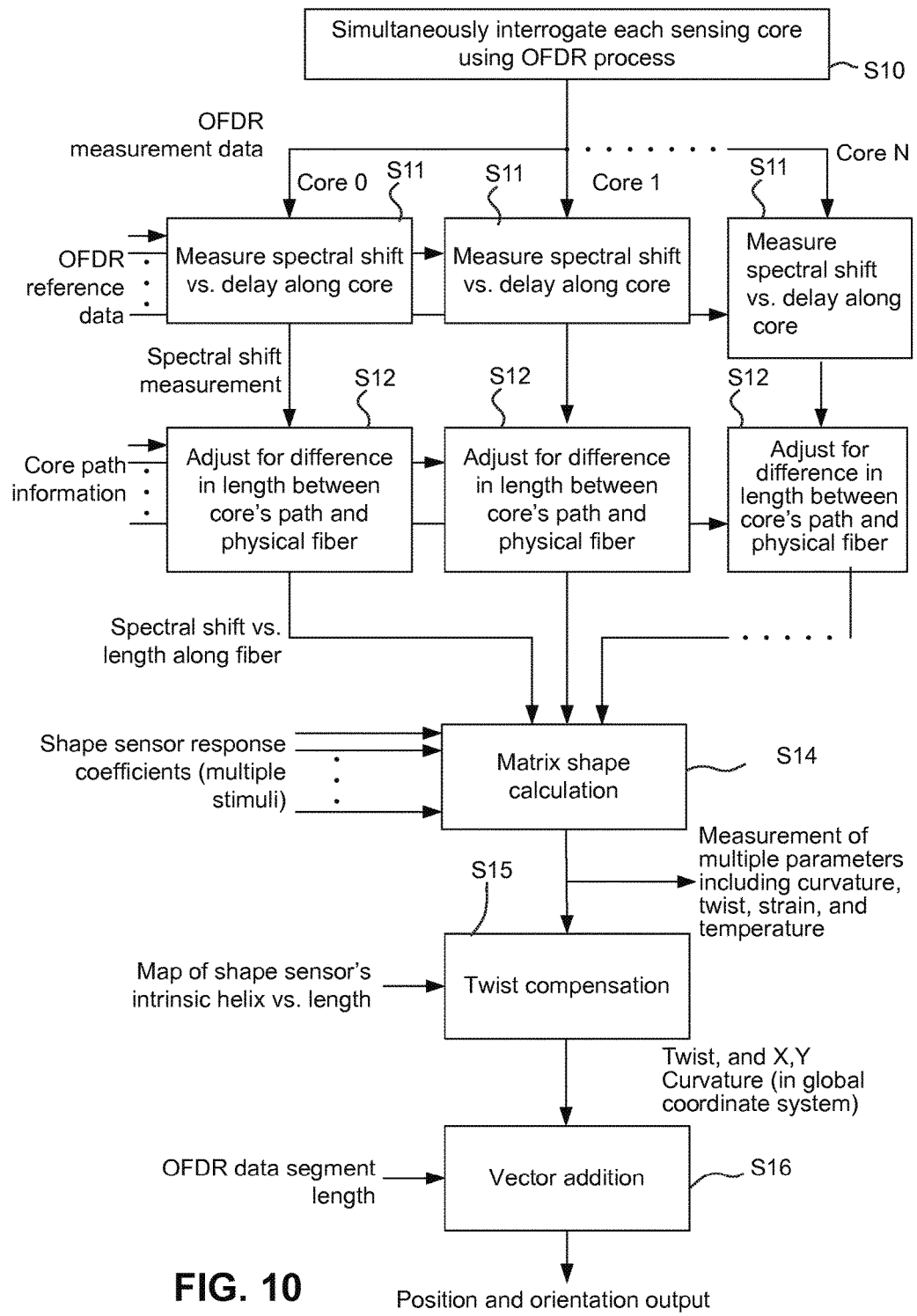
FIG. 10 is flow diagram that illustrates example procedures for the measurement of shape and position using OFDR data in multiple cores.

The flow diagram in FIG. 10 illustrates the measurement of shape and position using OFDR data in multiple cores. Similar steps from FIG. 8 are similarly labeled in FIG. 10. As in that example embodiment, OFDR data is collected simultaneously in each of N measurement cores using the system shown in FIG. 1 and the process outlined in FIG. 2 (S10). A measurement of spectral shift $\Delta v_n$ is made individually on each core by comparing measurement data to pre-recorded reference data stored in memory for each sensing core (S11). The pre-recorded measurement of the fiber's geometry is used to interpolate the spectral shift data and correct for differences in optical path length among the cores, particularly those resulting from the outer cores' helixed path (S12). The resulting N measurements of spectral shift vs. fiber length are fed into the matrix calculations described in Equations 9 or 10 (S14), resulting in a measurement of five stimuli including strain $\varepsilon_z$, curvature $\kappa_x$, $\kappa_y$, twist $\theta/L$, and temperature $\Delta T$. The five equations in the 5×5 matrix are solved for these five "unknowns" using the known values M11-M55 and the measured spectral shifts $\Delta v_0$-$\Delta v_4$. Values for the first 4 columns of matrix elements are found by a calibration process such that described in U.S. Pat. No. 8,531,655, and values for the final column of matrix elements M15-M55 are found by recording the spectral shift for each core as a function of temperature as shown in FIG. 7, fitting the response to a line, and taking the slope as the matrix element. These measurements of strain $\varepsilon_z$, curvature $\kappa_x$, $\kappa_y$, twist $\theta/L$, and temperature $\Delta T$ may be output to a user, and they may also be provided as inputs for a shape and orientation calculation. In this calculation, a pre-recorded map of the fiber's intrinsic helix (including variations) stored in memory is used in conjunction with the measured twist $\theta/L$ to un-wind the measured curvature response $\kappa_x$, $\kappa_y$, and produce an output of x and y curvature in a global coordinate system (S15). These curvature measurements, along with the twist measurement, are inputs along with OFDR data segment length to a vector addition process (S16) which builds a shape and position measurement, as well as a measurement of orientation at each point along the fiber. These calculations, and the methods to determine fiber geometry and calibration coefficients, are described in detail in U.S. Pat. Nos. 8,773,650 and 8,531,655.

Because the twist measurement error resulting from differences in strain and/or temperature response is small, compensation for this error does not require a high degree of fidelity in the discrimination of strain and temperature. Simulations in later sections show that an example 4.8% difference in temperature response between primary and secondary cores is sufficient to compensate for twist measurement error in shape sensing optical fibers.

Nonlinear Model of Shape Sensing Fiber Response

The shape measurement is also shown to have second order responses to these various stimuli. This section describes a model of the shape sensing fiber's response to external stimuli, including first-order (linear) and second-order effects. It presents an example embodiment, for the purpose of illustration, which uses mathematical derivations of spectral shift response in the central core and two outer cores of a helixed shape sensing fiber. In this case, the stimuli are limited to axial strain $\varepsilon_z$ along the fiber axis, applied twist per unit length $\theta/L$, and temperature change T. Three cores are required for this simplified model. Core 0 is defined to be a low-bend-loss (LBL) center core, Core 1 is an LBL outer core, and Core 2 is a highly Germanium-doped outer core.

The model describing the second order responses to three stimuli (axial strain, twist, and temperature) is described generally, so that the model may be easily extended to applied to the more general case described in the previous section which includes five stimuli (two additional equations describe curvature effects in Equation 10). The analysis and calculations presented here can be expanded to apply to shape calibrations with an arbitrary number of stimuli.

Nonlinear Response to Twist

Figure 11A:
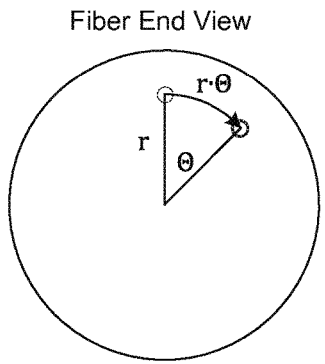
FIGS. 11A and 11B illustrate a physical response of a helically-routed outer core to twist.
Figure 11B:
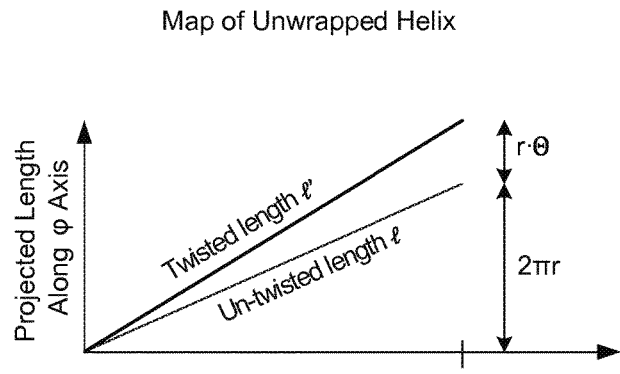

In an OFDR measurement, the sensing system measures the change in optical path length l' vs. l along the path of a given core. The center core's path length does not change in response to twist. However, the outer core's helixed routing makes it sensitive to extrinsically-applied twist. The physical response of a helically-routed outer core to twist is depicted in FIG. 11. Consider an applied twist of total angle $\Theta$, which accumulates over a single helix period of length p at a rate of $\theta/L$, where L is distance along the fiber's length z. The outer core's radius from the neutral axis is given by the variable r. In this relationship, the change in distance traveled along the $\varphi$-axis (axes are defined in FIG. 4A) is given by the expression below where r is the core radius, p is the helix period, $\Theta$ is the total applied twist in radians, and $\theta/L$ is the twist rate in units of radians per unit length:

$$r\Theta = r\frac{\theta}{L}p \quad (11)$$

Using the Pythagorean Theorem, the optical path lengths l and l' in the un-twisted state and under extrinsic twist are given by the following expressions.

$$\ell = \sqrt{p^2 + (2\pi r)^2} \quad (12)$$

$$\ell' = \sqrt{p^2 + \left(2\pi r + r\frac{\theta}{L}p\right)^2} \quad (13)$$

The relationship below is used to derive an expression for the strain measured along the path of the core in terms of the original and perturbed path lengths l and l'.

$$\varepsilon = \frac{\ell' - \ell}{\ell} \quad (14)$$

The expression for twisted path length l' can be re-organized in terms of original path length l.

$$\ell' = \ell\sqrt{1+x} \quad (15)$$

$$x = \frac{4\pi r^2 \frac{\theta}{L}p + \left(r\frac{\theta}{L}p\right)^2}{\ell^2} \quad (16)$$

A binomial expansion may be used to determine an approximate closed-form solution for l'.

$$\ell' = \ell \cdot \left(1 + \frac{1}{2}x + \frac{1}{8}x^2 + \dots\right) \quad (17)$$

For a typical shape sensing optical fiber, in which the radius r is small and the extrinsic twist per unit length $\theta/L$ is also small, the value x is significantly less than unity. Therefore, the small-value approximation is assumed and only the first and second terms in Equation 17 are considered. The resulting expression for apparent strain under extrinsically-applied twist is given below. Note that it includes terms which have both linear and nonlinear dependence on $\theta/L$.

$$\varepsilon_{twist} \approx \frac{2\pi r^2 p}{p^2 + (2\pi r)^2}\frac{\theta}{L} + \frac{r^2 p^2}{2(p^2 + (2\pi r)^2)}\left(\frac{\theta}{L}\right)^2 \quad (18)$$

In order to apply the linear matrix calculation described in Equations 9 and 10, Equation 18 is further simplified by assuming that the applied twist $\theta/L$ is sufficiently small that the second order term is negligible. Dropping the second order term in Equation 18 results in the expression given in Equation 5, which is referenced in the text as the "first order model." Under moderate-to-large amounts of applied twist, the approximation becomes increasingly less valid, resulting in error in the shape calculation. Both first order and second order terms in Equation 18 are necessary to avoid this error.

Nonlinear Response to Strain

Figure 12:
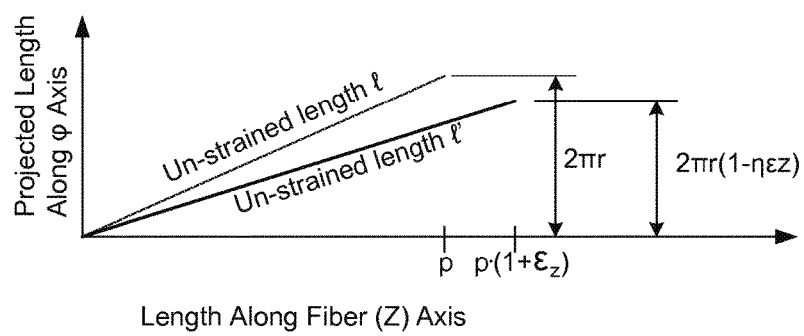
FIG. 12 shows an example of an outer core's physical response to z-axis strain.

Similarly, the outer cores of the helixed shape sensing fiber exhibit a nonlinear response to strain applied along the longitudinal z-axis of the fiber. The outer core's physical response to z-axis strain is illustrated in FIG. 12. Under strain $\varepsilon_z$, the helix period p is stretched by $(1+\varepsilon_z)$ and the projected length along the $\varphi$-axis is compressed by the Poisson effect. In this description, Poisson's ratio is described by the term $\eta$. An expression is derived for the outer core's response to z-axis strain $\varepsilon_{tension}$ following the path length derivation and binomial expansion in Equations 11-17.

$$\varepsilon_{tension} \approx \frac{p^2 - (2\pi r)^2\eta}{p^2 + (2\pi r)^2}\varepsilon_z + \frac{p^2 + (2\pi r\eta)^2\eta}{2[p^2 + (2\pi r)^2]}\varepsilon_z^2. \quad (19)$$

Again, a canonical linear approximation assumes that the applied strain $\varepsilon_z$ is sufficiently small to ignore the second order term in Equation 19. The resulting first-order model of strain response is presented in Equation 6. As with applied twist, under moderate-to-large amounts of axial strain $\varepsilon$, the first order approximation becomes increasingly less valid, resulting in error in the shape calculation. Both first order and second order terms in Equation 19 are necessary to avoid this error.

Nonlinear Response to Temperature

The temperature response measurements shown in FIG. 7 and Equation 2 indicate that the optical fiber has a non-zero second-order response to temperature changes. For LBL and high-Ge cores, these second-order temperature coefficients are described by $K_{T,LBL,2}$ and $K_{T,GE,2}$, respectively and determined empirically through a polynomial fit to the response curve. The second order term is relatively large; if it is neglected in Equation 2, an error of over 1% will result for a temperature change as small as 8° C.

Nonlinear Shape Sensor Model

The nonlinear shape sensor model comprises a system of sensor response equations, including linear and nonlinear terms, which describe the sensor's spectral shift response to multiple stimuli, denoted by the vector s. This system of equations can be represented in matrix form in which there is one matrix for each order of the equation: a linear computation matrix M and a second-order computation matrix N, and the squaring of the stimulus vector s is defined component-wise. The sensor's response at each point along the fiber is measured by a vector of spectral shift values Δv, in which there is one scalar entry for each of the optical cores interrogated.

$$\Delta v = Ms + Ns^2 \quad (20)$$

Based on the analysis above, the stimulus vector s, and computation matrices M and N are described for this simplified three-input model in the equations below.

$$s = \begin{bmatrix} \varepsilon_z \\ \theta \\ L \\ \Delta T \end{bmatrix}, \quad (21)$$

$$M = \begin{bmatrix} K_\varepsilon & 0 & K_{T,LBL} \\ K_\varepsilon \frac{p^2 - (2\pi r)^2 \eta}{p^2 + (2\pi r)^2} & K_\varepsilon \frac{2\pi r^2 p}{p^2 + 2\pi r^2} & K_{T,LBL} \\ K_\varepsilon \frac{p^2 - (2\pi r)^2 \eta}{p^2 + (2\pi r)^2} & K_\varepsilon \frac{2\pi r^2 p}{p^2 + 2\pi r^2} & K_{T,Ge} \end{bmatrix} \quad (22)$$

$$N = \begin{bmatrix} 0 & 0 & K_{T,LBL,2} \\ K_\varepsilon \frac{p^2 + (2\pi r \eta)^2}{2[p^2 + (2\pi r)^2]} & K_\varepsilon \frac{r^2 p^2}{2(p^2 + 2\pi r^2)} & K_{T,LBL,2} \\ K_\varepsilon \frac{p^2 + (2\pi r \eta)^2}{2[p^2 + (2\pi r)^2]} & K_\varepsilon \frac{r^2 p^2}{2(p^2 + 2\pi r^2)} & K_{T,Ge,2} \end{bmatrix}. \quad (23)$$

The numerical model described in Equations 20-23 is used in simulations in the following sections to illustrate the validity of the described approaches to generate and apply a practical second-order shape sensing calculation. All simulations use a typical value of $K_\varepsilon = -0.15$ GHz/με. The measured values of the thermal response from above are used: $K_{T,LBL} = -1.15469$ GHz/° C. and $K_{T,Ge} = -1.21002$ GHz/° C. The quadratic temperature response coefficients $K_{T,LBL,2}$ and $K_{T,Ge,2}$ are as measured previously ($K_{T,LBL,2} = -0.00146364$ GHz/° C.$^2$ and $K_{T,Ge,2} = -0.00154851$ GHz/° C.$^2$). A common fiber geometry is used with r=72 μm and p=15.15 mm.

Error Resulting from Linear Shape Computation

The analysis and data presented in the previous five sections describing the nonlinear model show that a fiber exhibits a nonlinear response to extrinsically-applied twist, z-axis strain, and temperature changes. Existing approaches using a first-order (linear) computation, such as the matrix approach described in Equation 9, do not account for this nonlinear response and therefore are prone to error when the applied twist or axial strain becomes too large. This problem persists in the temperature-compensated linear matrix calculation of Equation 10. Temperature compensation eliminates one source of error but leaves the residual error associated with un-modeled nonlinear responses. Based on these recognitions, the inventors determined that a new shape sensing calculation is desirable that accounts for the nonlinear response to external stimuli, including those described in Equations 18 and 19. In order to more fully characterize the response of the fiber, the nonlinear computation must account for temperature in addition to strain, curvature and twist.

Nonlinear Shape Computation

The inventors discovered that the errors described above are correctable with the use of a second-order computation. This section provides an overview of the second-order shape computation, and specific implementation examples are detailed in the following sections.

Figure 13:
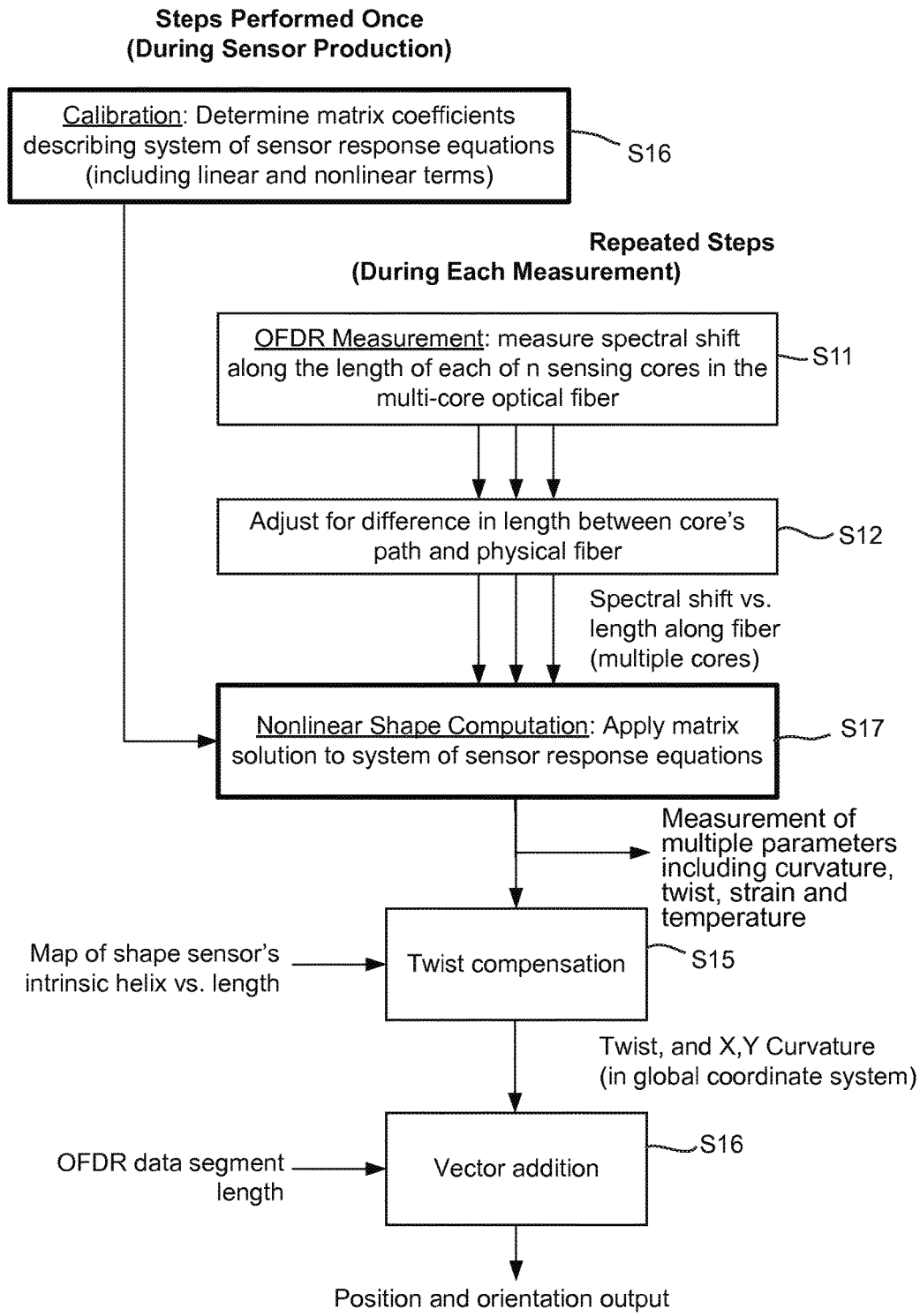
FIG. 13 is a flow diagram showing example procedures for performing a temperature-compensated nonlinear shape computation.

An example temperature-compensated nonlinear shape computation is implemented in the following general steps, as outlined in the flow diagram of FIG. 13. Similar steps from previous flowcharts use similar step numbers. First, a calibration step is performed during sensor production (S16). This calibration uses a series of sensor response measurements to known stimuli to determine the terms in the matrices M and N in Equation 20. These calibration terms are stored in memory, along with other pre-computed information about the fiber's properties such as the map of its intrinsic helix vs. length and OFDR data segment length, and are applied during subsequent measurements.

During each OFDR measurement, an OFDR system like the example shown in FIG. 1 interrogates each of the fiber's sensing cores using the example method outlined in FIG. 2 (S11). After adjustment for the path length differences between the cores (S12), the calibrated shape computation matrices are applied as part of the nonlinear shape computation (S17). This produces measurements of multiple output parameters, such as curvature, twist, strain, and temperature. Note that the three-input model presented in the following sections analyzes temperature, twist, and strain, for simplicity of illustration. These outputs are then fed into the twist compensation (S15) and vector addition (S16) steps to produce a position and orientation output in the manner as the process outlined in FIG. 10. In this case, the position and orientation output is more accurate because it accounts for the nonlinear response of each core due to various stimuli.

Calibration of Nonlinear Shape Computation

In order to apply the nonlinear shape computation described above, one must determine the coefficients of the two calculation matrices M and N. This process is defined as "calibration" of the shape sensing fiber and resulting calculation. This section provides several example calibration methods. In this illustration each calibration matrix is of size 3×3, and there are therefore eighteen unknown parameters for which to solve.

In practice, the known stimulus values, such as applied strain or temperature, are independently measured with calibrated external devices, such as precision micrometers or RTD temperature probes. Calibration preferably also takes into account measurements of fiber core geometry, such as those outlined in U.S. Pat. No. 8,531,655, to derive physically meaningful constants from the matrix coefficients determined in M and N.

Both calibration methods may be computed at a single point on the shape sensor, under the assumption that fiber geometry is constant along the sensor. Storage space permitting, calibration matrices may be computed for each point on the sensor and stored for application of different calibration coefficients along the sensor's length. In another embodiment, the elements of calibration matrices determined at multiple points may be averaged to approximately describe the entire sensor in a single pair of calibration matrices M and N.

Small-Stimulus Approximate Calibration

Figure 14:
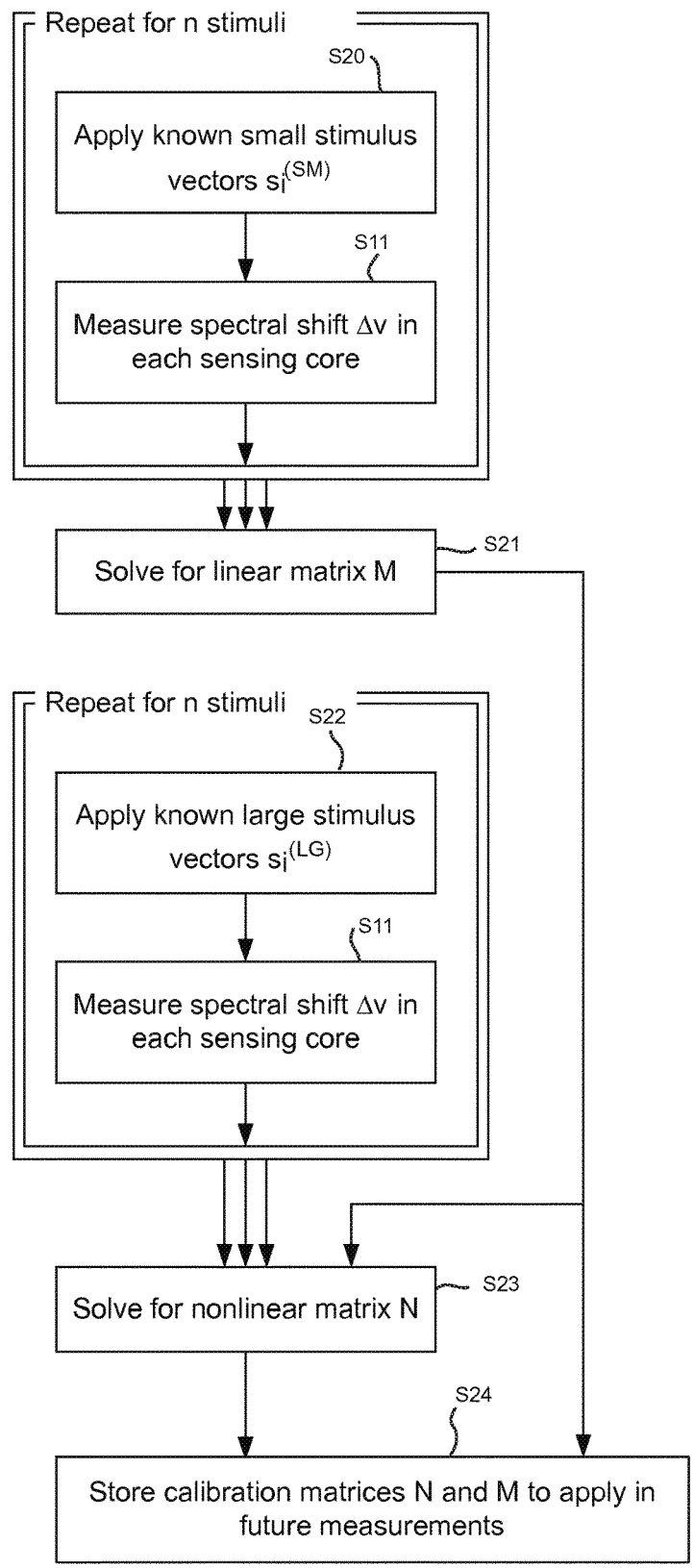
FIG. 14 outlines an example small-stimulus and large-stimulus method of determining the linear and quadratic calibration matrices M and N.

FIG. 14 outlines an example embodiment using a small-stimulus method of determining the linear and quadratic calibration matrices M and N. This method is based on the observation that, for sufficiently small stimulus parameters, the action of the linear matrix M dominates that of the nonlinear matrix N. In this embodiment, the fiber optic sensor's spectral response Δv is measured using OFDR (S11) under a set of n known stimuli $s_i^{(SM)}$ (S20), where i={1:n}, with small but measurable input values. In an example implementation, these vectors may be selected such that each has only one nonzero entry. In general, the set of n stimulus vectors should be linearly independent.

An approximate solution for the linear matrix M is then determined by solving Equation 24 below for all n stimulus vectors (S21). The matrix concatenation approach in the next section details one example method to implement this approximate solution.

$$\Delta v \approx M s_i^{(SM)} \quad (24)$$

Next, the response of the fiber is re-measured (S11) using a second set of known stimuli $s_i^{(LG)}$ with larger input values (S22). The larger stimulus values elicit a significant response from the nonlinear term in the sensor's system of response equations. The nonlinear matrix N is then determined (S23) by substitution of the linear matrix M, measured in the previous calibration step, into Equation 20.

$$N(s_i^{(LG)})^2 = \Delta v - M s_i^{(LG)} \quad (25)$$

The calibration matrices N and M are stored for application to future measurements (S24).

There are two disadvantages to this example embodiment: (1) it gives approximations to the true calibration matrices, and (2) values of stimulus parameters sufficiently small to allow the approximation may not be obtainable in a laboratory setting. A more robust method for computing the calibration matrices is described as follows.

Robust Calibration

Figure 15:
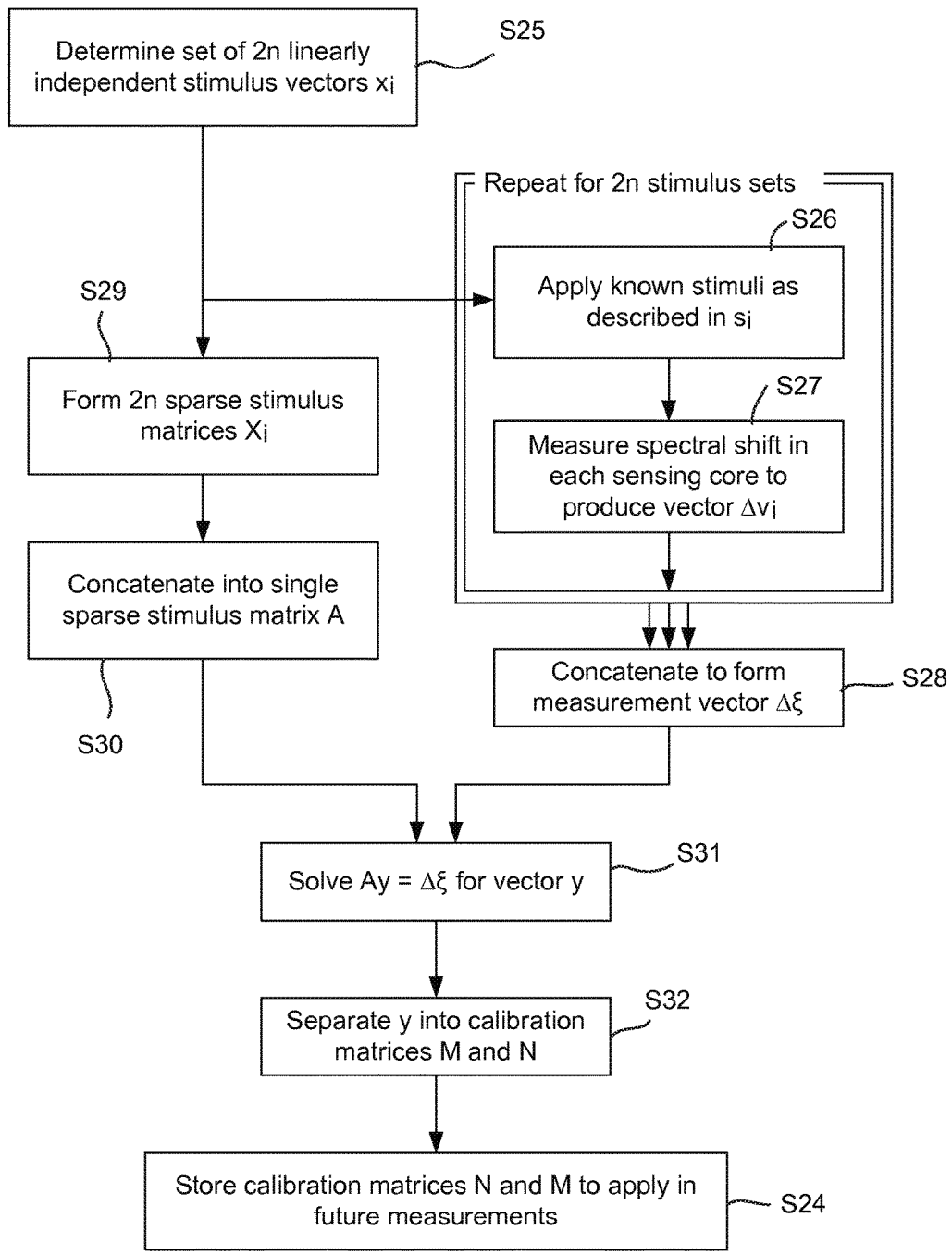
FIG. 15 is a flow diagram illustrating example procedures for determining M and N with a set of linearly independent stimulus vectors.

In another example embodiment, the determination of M and N is performed with a set of linearly independent stimuli, in which no individual stimulus is required to be either small or zero. This process is outlined in the block diagram of FIG. 15 and is described in detail below.

The nonlinear system described by Equation 20 can be written as a single matrix equation of size $2n^2$, which is linear and soluble for M and N. First, a total of 2n sets of stimuli are defined (S25) such that they form $2n$ linearly independent row vectors $x_i$, as defined below. Each set of stimuli $s_i$ contains n entries corresponding to known stimulus values, such as strain, temperature, or twist.

$$x_i = [s_i \ s_i^2] \text{ in } \mathbb{R}^{2n}, i=1,2,\ldots,2n \quad (26)$$

Next, for each stimulus set, a sparse stimulus matrix $X_i$ is built (S29) from the $i^{th}$ stimulus vector $x_i$. Each matrix $X_i$ has n rows and $2n^2$ columns.

$$X_t = \begin{bmatrix} x_t & 0 & 0 & 0 \\ 0 & x_t & 0 & 0 \\ 0 & 0 & \ddots & 0 \\ 0 & 0 & 0 & x_t \end{bmatrix} \text{ in } \mathbb{R}^{n \times 2n^2} \quad (27)$$

The sparse stimulus matrices Xi are then concatenated to form a single sparse stimulus matrix A (S30) with dimension $2n^2 \times 2n^2$.

$$A = \begin{bmatrix} X_1 \\ \vdots \\ X_{2n} \end{bmatrix} \text{ in } \mathbb{R}^{2n^2 \times 2n^2} \quad (28)$$

Spectral shift measurements are performed (S27) on all sensing cores for each of the 2n sets of stimuli (S26). For each stimulus set $s_i$, these spectral shift values are compiled into a vector $\Delta v_i$ (S27), and the all 2n vectors are concatenated (S28) to build the measurement vector Δξ, which has a single column and $2n^2$ rows.

$$\Delta \xi = \begin{bmatrix} \Delta v_1 \\ \vdots \\ \Delta v_{2n} \end{bmatrix} \text{ in } \mathbb{R}^{2n^2} \quad (29)$$

Once the stimuli have been tabulated and the resulting spectral shift measurements have been made, these values are used to solve the Equation 30 below for the vector y (S31).

$$Ay = \Delta \xi \quad (30)$$

The solution vector y, which has length $2n^2$, contains elements of the linear and quadratic calibration matrices M and N, respectively (S32). This vector is formed by stacking the columns $(M)_i$ and $(N)_j$ of linear and quadratic matrices into a single vector y containing the unknown variables. After solving Equation 30 to determine the entries in y, this vector is un-packed to fill out the entries in M and N, which are then stored in memory for application in future measurements (S24).

$$y = \begin{bmatrix} (M)_1 \\ (N)_1 \\ \vdots \\ (M)_n \\ (N)_n \end{bmatrix} \text{ in } \mathbb{R}^{2n^2} \quad (31)$$

So long as the stimulus parameters are chosen so that the set $x_i$ is linearly independent, stimulus values achievable in laboratory conditions can be used to compute the calibration matrices. Since the stimulus vectors $x_i$ are linearly independent, the square matrix A is full-rank, and there is therefore a unique solution to the linear system of equations in Equation 30. Note that in the case of a linear model defined by Equations 5 and 6, the calibration process is reduced to choosing n linearly independent stimulus vectors $(s)_i$ and simplifying the concatenated stimulus matrix to $x_i = s_i$.

Iterative Computation of Second-Order Solution

Figure 16:
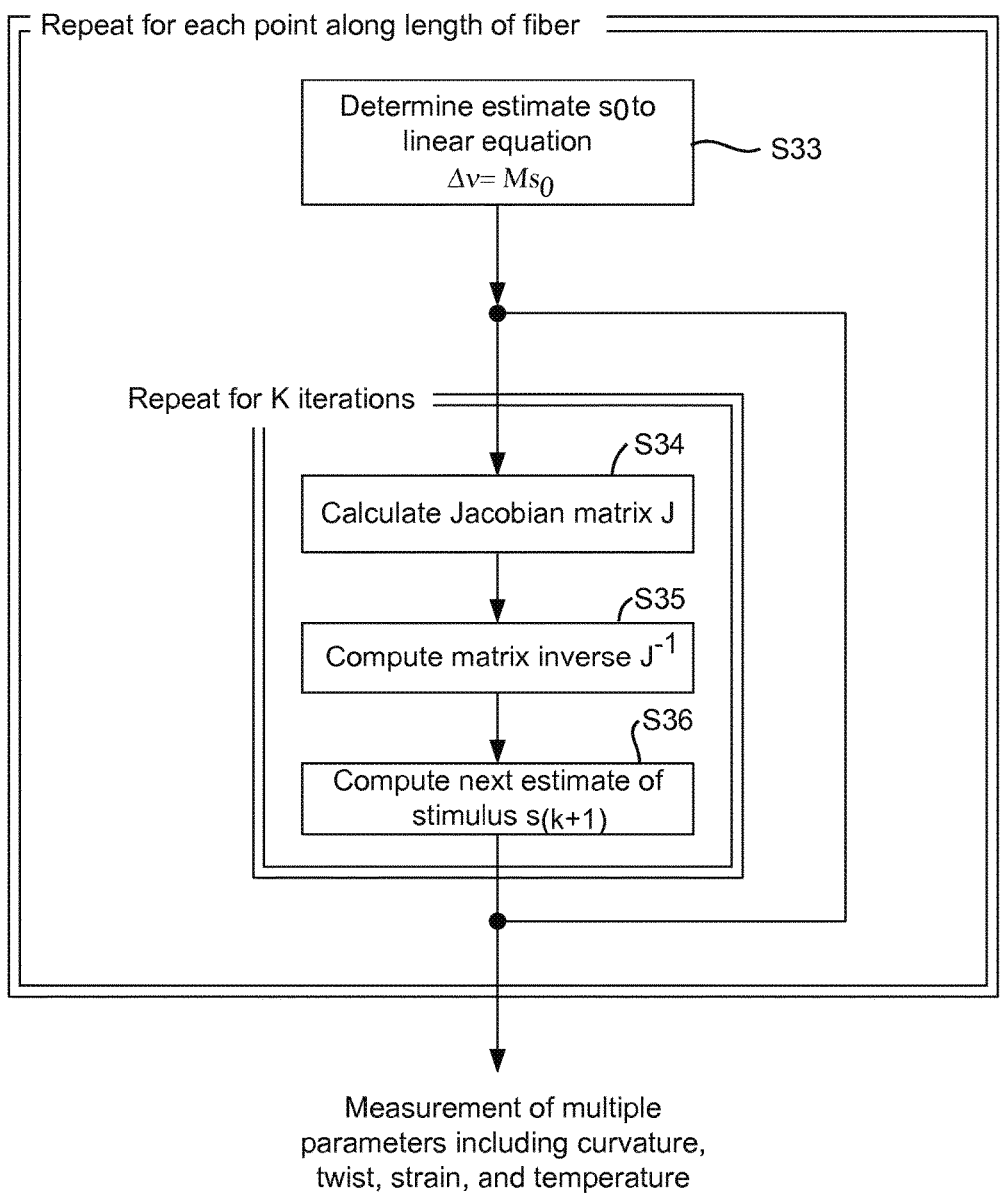
FIG. 16 is a flow diagram illustrating example procedures for an iterative approach, based on Newton's Method, to solving for unknowns given known M and N and measured Δv repeated at each of multiple points along the fiber.

The linear and quadratic coefficient matrices M and N are determined during sensor production. During each measurement, the sensing system uses this information along with the acquired measurement of Δv in each core, to determine a measurement of the stimuli s. This process requires that the sensing algorithm solve the system of sensor response equations described in Equation 20. The nonlinear system of equations in Equation 20 does not have a known, closed-form solution. In one embodiment, an iterative approach, based on Newton's Method, is used to solve for unknown s given known M and N and measured Δv. The Newton's method solution, which must be repeated at every point along the fiber, is summarized in block diagram form in FIG. 16.

The Newton's method solution begins by re-writing Equation 20 in the following form. The goal of the iterative solution is to compute a vector of measured stimuli s for which the function F(s) is zero.

$$F(s) = Ns^2 + Ms - \Delta v \quad (32)$$

Equations 20 and 32 are equivalent and comprise a general expression in which the linear matrix M is equivalent to the embodiments described in Equations 3, 9, and 10. The solution to this linear approximation is defined as the estimated stimulus $s_0 \approx s$, which can be found by solving the following equation. Solving this approximate linear equation results in the shape measurement output errors described in the previous section (S33).

$$\Delta v = M s_0 \quad (33)$$

The first iteration of the solution to Equation 32 is detailed by the following equations, in which the linear approximation so is used as an estimate to find the next iteration for the solution of the nonlinear system of sensor response equations. J is the Jacobian matrix of the system of sensor response equations in Equation 32. The elements of J are calculated from the derivative of F(s), as shown in the equations below.

$$s_0 = M^{-1}\Delta\gamma \quad (34)$$

$$s_1 = s_0 - J(s_0)^{-1} N s_0^2 \quad (35)$$

$$(J)_{tj} := \frac{\partial V_t}{\partial s_j} = 2 n_{tj} s_j + m_{tj} \quad (36)$$

The procedure is thus to calculate an initial estimate for the Jacobian $J_0$ using the linear approximation for the solution $s_0$ (S34), calculate the inverse of $J_0$ (S35), use the inverse of $J_0$ to compute the next estimate of the solution $s_1$ (S36), which is used to calculate the next estimate of the Jacobian $J_1$. The Netwon's method algorithm iterates the process described above until it converges on a solution for s which satisfies F(s)=0. The equation below describes the $(k+1)^{th}$ iteration of this process.

$$s_{k+1} = s_k - J(s_k)^{-1} N s_k^2 \quad (37)$$

The Jacobian matrix should be well-conditioned at each iteration. Conditioning is verified by simulation of extreme stimuli sets, for each sensor calibration. In a practical example, three or fewer iterations were found to be sufficient for convergence to a solution of Equation 32. The number of iterations may be fixed at specific limit based for more predictable computation timing Simulated Results The following simulation is presented to illustrate the validity of the described approach to calibration and computation of the example 3×3 nonlinear system of sensor response equations. This simulation also demonstrates the effectiveness of thermal compensation in the shape sensing measurement through the introduction of an alternately-doped fiber core with 4.8% difference in thermal response. For comparison, three different calculations are simulated, each defined by the type of thermal compensation and calculation method used.

| Simulation Description | Thermal compensation | Calculation method |
|---|---|---|
| 1. No compensation | None | Linear |
| 2. Linear compensation | Alternately-doped core: 4.8% difference in response | Linear |
| 3. Quadratic compensation | Alternately-doped core: 4.8% difference in response | Nonlinear ($2^{nd}$ order) |

Simulation software was produced which generates the calibration matrices at a fixed set of calibration stimuli. The simulated spectral shifts are determined for a range of stimulus values, and the approximated stimulus values are recovered by solving the nonlinear system of sensor response equations in Equation 32. The error between the simulated and approximated stimulus values can then be deduced for each of the thermally compensated and non-compensated cases.

The calibration matrices were computed using the robust calibration method, with calibration stimulus values given below.

$$s = \begin{bmatrix} -200 & 0 & 0 & 200 & 0 & 0 \\ 0 & -90 & 0 & 0 & 90 & 0 \\ 0 & 0 & -40 & 0 & 0 & 40 \end{bmatrix} \begin{pmatrix} \mu\varepsilon \\ °/m \\ °C. \end{pmatrix} \quad (38)$$

Note that while the calibration stimulus matrix is not full-rank, the concatenated stimulus matrix [s s²] is full-rank, allowing for determination of the calibration matrices M and N.

The following set of measurement stimuli $\{\varepsilon_z, \theta/L, \Delta T\}$ was tested to represent relevant-environment conditions for a variety of applications. From prior experience, it is known that a typical shape sensor in a loose-tube package (not deliberately strain-coupled) remains well within a +/−200 ue strain range during normal use. Under normal use, a typical sensor will experience less than +/−90°/m of extrinsic twist and operate between +/−40° C.

$$\varepsilon_z \in [-200, +200] \, \mu\varepsilon \quad (39)$$

$$\frac{\theta}{L} \in [-90, +90] \, °/m$$

$$\Delta T \in [-40, +40] \, °C.$$

A total of 1,030,301 configurations were tested by testing all combinations of 101 values of each stimulus. Three Newton iterations were employed in the nonlinear computation. FIGS. 17A-17C compare temperature, applied twist and axial strain errors for the three simulation conditions in the table presented above in adjacent sub-plots. For each calculation condition, error is defined as the difference between the simulated measurement result and the true response of the fiber as modeled by Equations 2, 18, and 19. FIGS. 17A-17C shows the functional dependence of error vs. strain and twist at a fixed temperature of T=20° C.

Figure 18C:
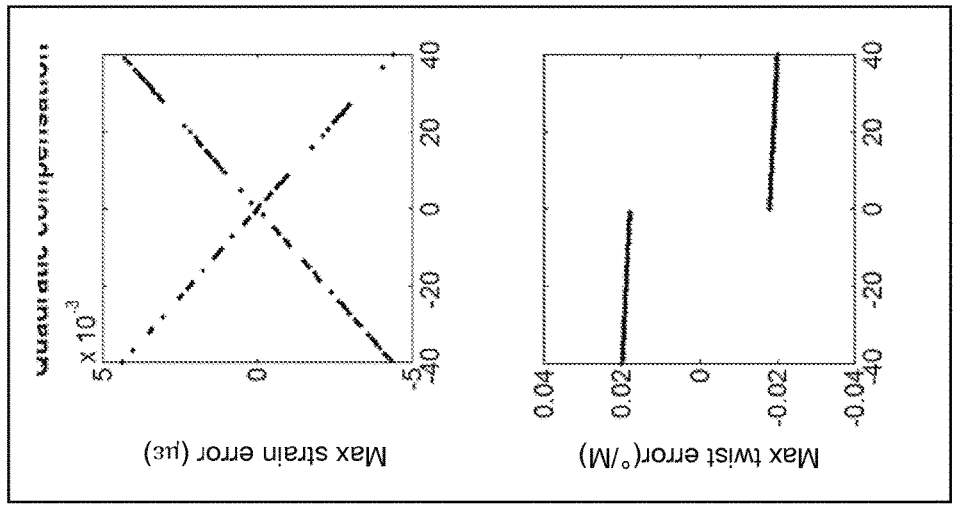
FIGS. 18A-18C show example maximum twist and strain errors with no compensation, linear compensation, and quadratic compensation.
Figure 18B:
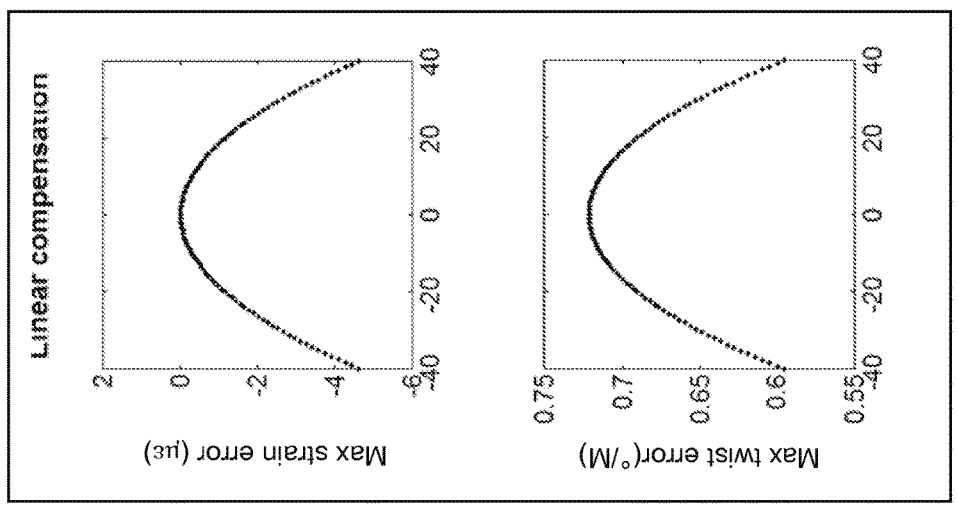
Figure 18A:
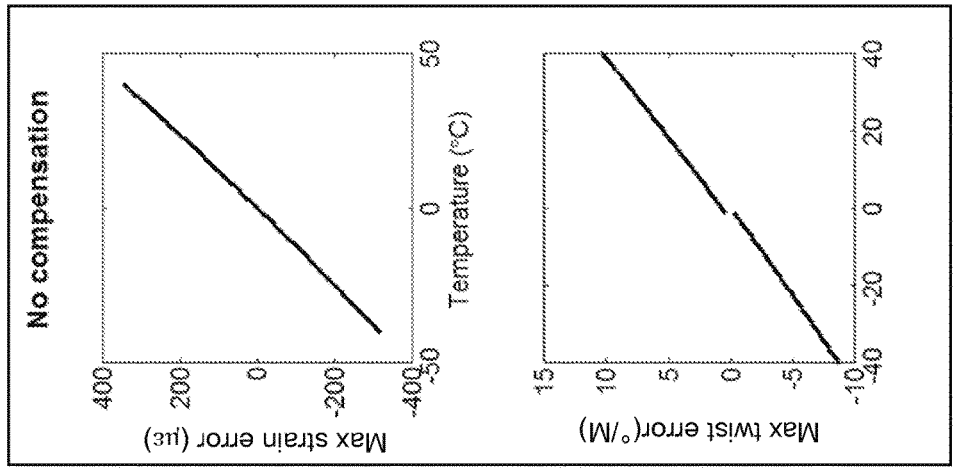

FIGS. 18A-18C present example maximum values of strain measurement error and twist measurement error simulated across the domain of temperatures from −40 to 40° C. In the top row of plots, the maximal strain error is defined over all values of twist. The bottom row depicts the maximal twist error over all values of strain.

The maximum simulated measurement errors across the domain of all strain, twist, and temperature stimuli are tabulated below. Because temperature is not measured in Simulation 1, there is no temperature measurement error listed. However, temperature effects contribute significantly to the high level of strain and twist measurement error observed across the simulated domain. These effects are significantly reduced in Simulation 2 and almost entirely eliminated in Simulation 3.

| | Temperature compensation | | |
|---|---|---|---|
| Error | None | Linear | Quadratic |
| Strain ($\mu\varepsilon$) | 346 | −4.63 | $4.40 \times 10^{-3}$ |
| Twist (°/m) | 10.3 | 0.721 | $-2.00 \times 10^{-2}$ |
| Temp (° C.) | — | 2.45 | $8.67 \times 10^{-13}$ |

Practical Computation of Second-Order Solution

In some applications, the iterative solution presented above may be computationally prohibitive. Even a single iteration may be considered computationally expensive due to the need to perform a stimulus-dependent inversion of the Jacobian matrix. In this example embodiment, a computationally feasible method to approximate the solution of the nonlinear shape system in a single deterministic computation step is developed. This approach is shown to be highly accurate and well-optimized for real-time computation of shape measurements.

This example embodiment makes an approximation which precludes the requirement of this stimulus-dependent inversion. The action of the Jacobian and non-linear calibration matrix on $s_0^2$ in Equation 32 is approximated by the action of a constant matrix C on the concatenated stimulus vector $[s_0; s_0^2]$ as described below.

$$-J(s_0)^{-1} N s_0^2 \approx C \begin{bmatrix} s_0 \\ s_0^2 \end{bmatrix} \quad (40)$$

The approximation matrix C is not dependent on stimulus values and can therefore be determined prior to making measurements. C can be computed using quadratic curve fitting over an n-dimensional domain. This approximation can be made at the time of calibration, using the same calibration stimuli used to determine the linear and quadratic shape matrices M and N, or the approximation can be made after calibration, using a simulation as described above. Because the curve fitting is applied over the entire n-dimensional domain, the matrix C describes the fiber's response over the entire range of stimuli, including axial strain, temperature, applied twist, and curvature.

Figures 19A, 19B, 19C:
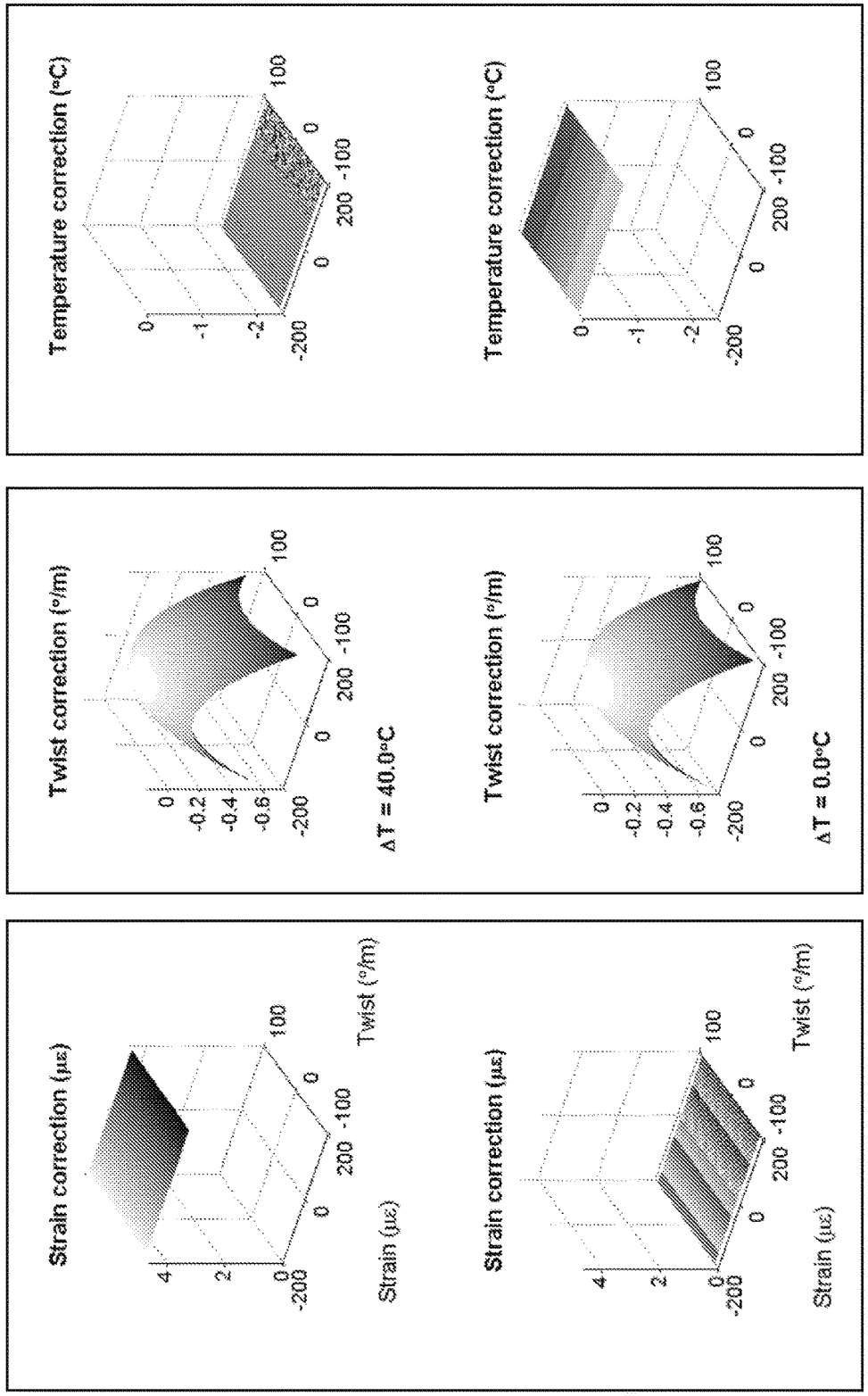
FIGS. 19A-19C show example the strain, twist, and temperature corrections at 0 and 40 degrees Celsius.

FIGS. 19A-19C provide a visualization of this n-dimensional curve fitting as a set of 3D plots produced at different temperatures. The quadratic fit to determine the Newtonian approximation matrix C is accomplished by matrix computation. The correction matrix is determined by approximately solving a linear system (which may be overdetermined in the case that the computation is made using many simulated stimulus vectors). Using m≥n stimulus vectors $[s_0]_{i=1}^m$ each satisfying Equation 34, the fit process starts by defining stimulus matrix B as follows.

$$B = \begin{bmatrix} [s_0] \\ [s_0^2] \end{bmatrix} \text{ in } \mathbb{R}^{2n \times m} \quad (41)$$

Next, the matrix fitting algorithm solves the following system of nonlinear equations.

$$CB = -J([s_0])^{-1} N[s_0^2] \quad (42)$$

This solution is determined by multiplication of the pseudo-inverse, as described in the equation below.

$$C = -J([s_0])^{-1} N[s_0^2] B^T (BB^T)^{-1} \text{ in } \mathbb{R}^{m \times 2n} \quad (43)$$

Once C is known, it can be applied as a single-step approximation to Equation 32, eliminating the need to compute a matrix inverse or perform an iterative step.

$$s \approx s_0 + C \begin{bmatrix} s_0 \\ s_0^2 \end{bmatrix} \quad (44)$$

Simulated Results

Figure 20C:
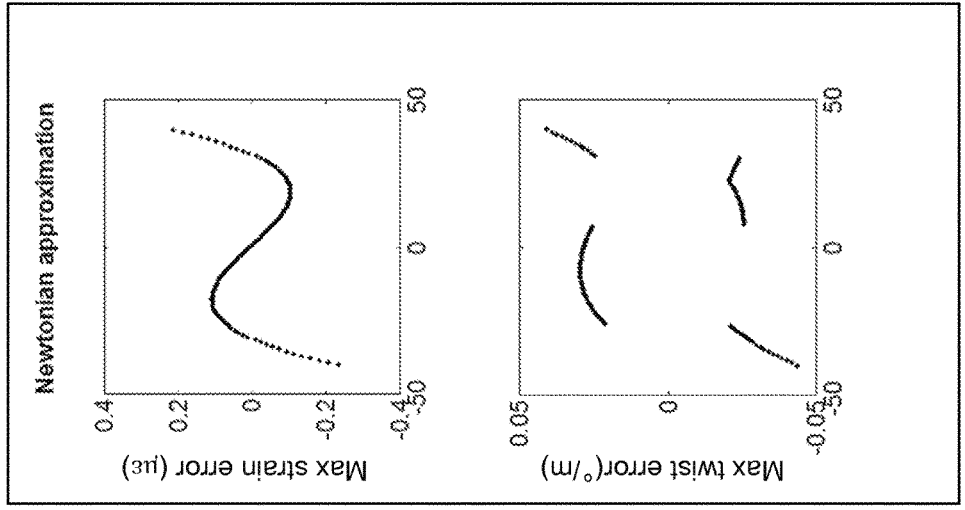
FIGS. 20A-20C show example maximum twist and strain errors with no compensation, linear compensation, and Newtonian compensation.
Figure 20B:
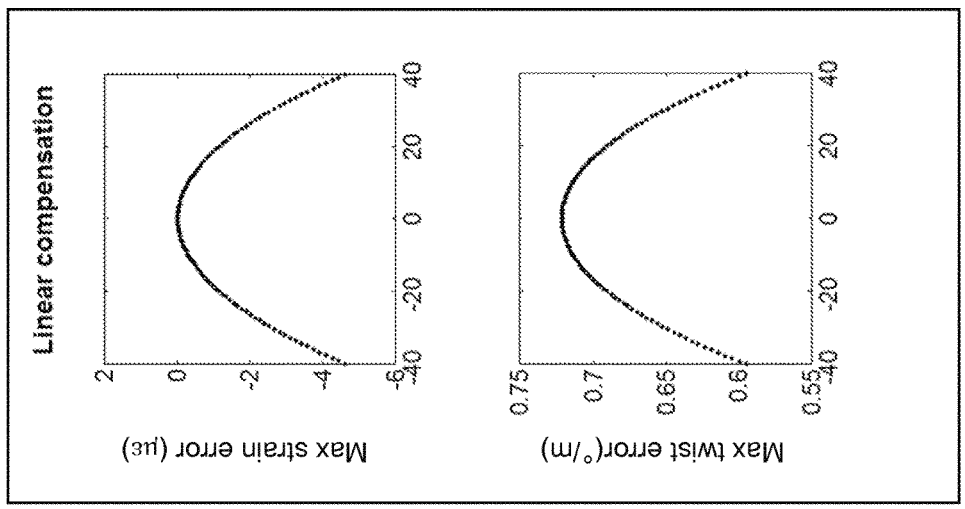
Figure 20A:
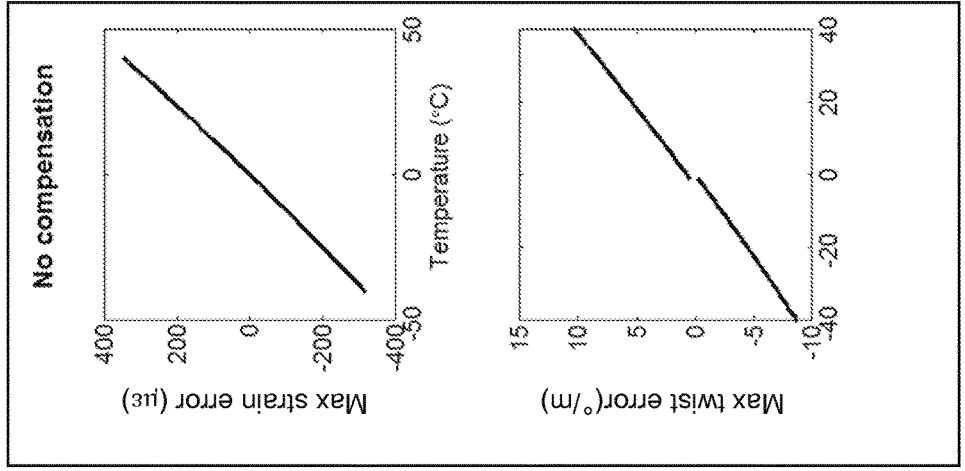

The simulation described above was re-run in which the quadratic temperature compensation in Simulation 3 was performed using the single-step Newtonian approximation matrix C. FIGS. 20A-20C graphically present maximum values of strain measurement error and twist measurement error simulated across the domain of temperatures from −40 to 40° C. These plots are similar to those in FIGS. 18A-18C, with the exception of the difference in nonlinear computation technique. A comparison between the two plots shows negligible difference between the exact Newton's Method solution and the more computationally efficient Newtonian approximation. Using the computationally efficient method, the maximum strain and twist measurement errors are less than 0.5µε and 0.05°/m, respectively.

The strain, twist, and temperature errors associated with the single-step Newtonian approximation technique are negligible. So long as these errors in strain, twist, and temperature are within noise-limited measurement capability, the single-step Newtonian approximation method is a complete, viable, and computationally efficient alternative to a complete solution to the quadratic problem. If more accuracy is desired, the second-order correction may be extended to include the quadratic cross terms of stimulus.

Twist Error Minimization Through Fiber Design

A further example embodiment is now described that reduces or minimizes the temperature/strain-induced twist error but that does not require an additional 5$^{th}$ input signal. This embodiment does not distinguish between axial strain and temperature changes. Instead, through tuning of the doping and geometry of each the fiber's cores, this embodiment reduces or minimizes the effects of either temperature or strain on the twist measurement. Then, the shape sensing procedures are calibrated to compensate for whichever term (temperature or strain) has not been minimized. Three example implementations of this approach are summarized in the table below.

Implementations of Physical Twist Error Reduction/Minimization

| Fiber Design | Shape Algorithm Calibration |
|---|---|
| Minimize twist response to temperature | Interpret center core signal as entirely due to axial strain |

| Fiber Design | Shape Algorithm Calibration |
|---|---|
| Minimize twist response to axial strain | Interpret center core signal as entirely due to temperature |
| Equalize twist response to axial strain and temperature | Both temperature and axial strain cause same twist error for the same shift in the center core optical frequency, so both are compensated with the same correction factor |

Optimization of the fiber's temperature-twist or strain-twist response can be done by designing a fiber with a particular dopant level in the center and outer cores. If the fiber draw begins with source preforms that have all the same doping and core size, the effective index (which is adjusted to include the effect of the longer path length for twisted outer cores) of the outer cores will be higher because of the helix geometry. In this case, one expects to see a twist-temperature coefficient near zero but a strong twist-axial strain response coefficient, for a typical Optical Path Ratio of 1.0001 (assuming a helix period of 20 mm and an outer core radius of 35 microns). The Optical Path Ratio is defined as the ratio of the optical time of flight delay of an outer core vs. the center core for a given length of physical fiber.

If the fiber designer chooses a center core with higher doping so that the higher index compensates for the extra path length of the outer cores, one expects to see a twist-strain coefficient near zero but a much stronger twist-temperature coefficient, as the doping difference between the center core and the outer cores will lead to difference in the spectral shift response between the center core and outer cores, which will lead to a false twist signal.

Because the example shape sensing fiber has seven cores, there are two different groups (triads) of outer cores available for shape sensing, and small natural variations in core doping will lead to small differences in the core spectral shift response to axial strain and temperature. During calibration, the optimal triad may be used to provide a desired minimal temperature or strain response. This choice can be performed on the specially-designed fiber designed to have a doping difference between the center core and outer cores, or a fiber that was designed to have identical core doping/geometry on all seven cores but with minor natural variations. In either case, the fiber's twist response to temperature and strain is measured prior to sensor manufacturing, and the optimal triad is chosen for sensing. One might select one triad to have an applied twist signal that is temperature-independent and the second triad to be strain-independent and alternate sampling to eliminate both. Moreover, if the two triads have applied twist sensitivities to strain and temperature that are sufficiently different, the effects can be separated with a technique similar to that described above.

Figure 21:
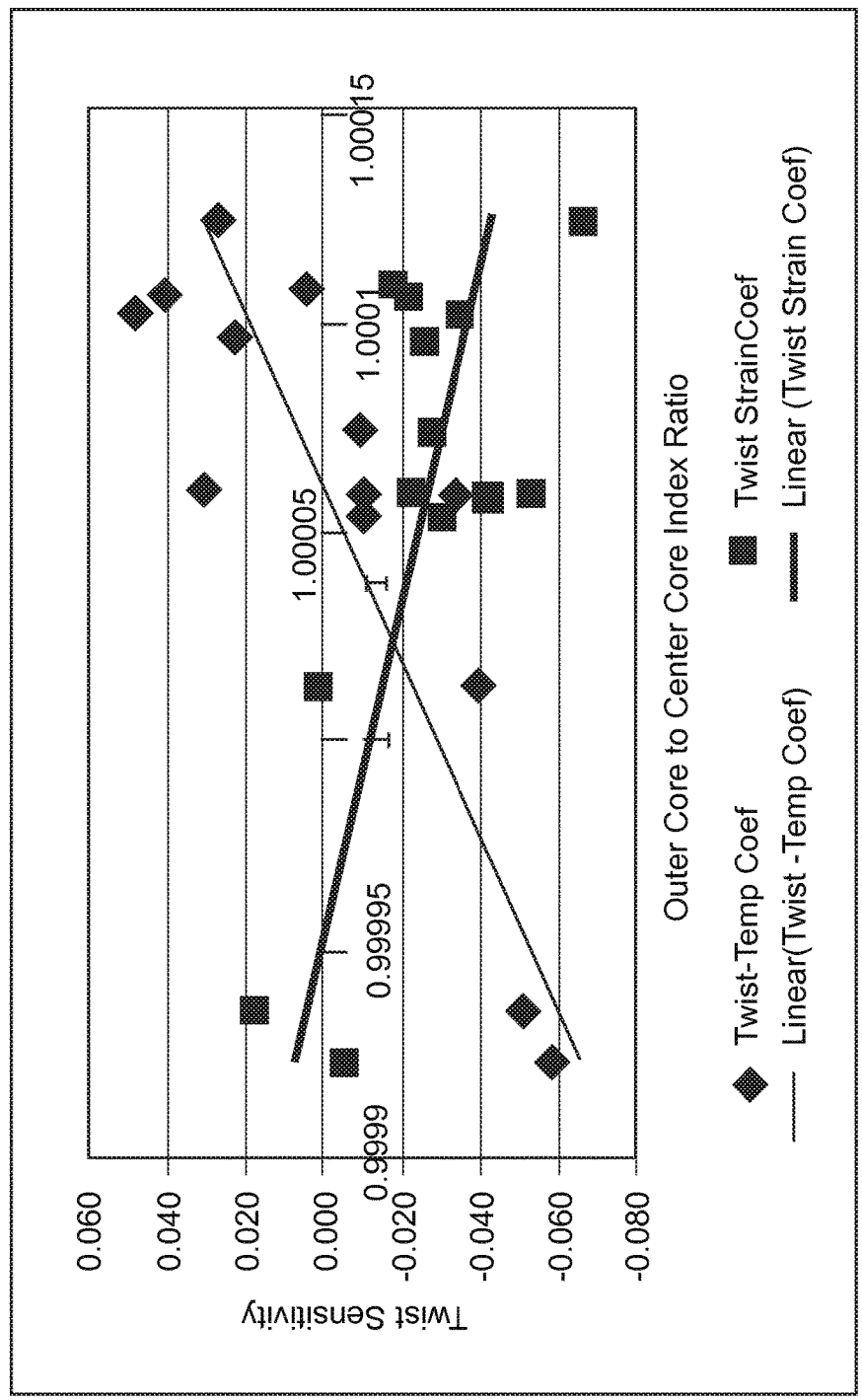
FIG. 21 is an example graph of twist sensitivity v. outer core to center core index ratio.

FIG. 21 is a graph showing results of an analysis which included different sensing triads selected from multiple shape sensing fiber samples which included fiber from different draws. All fiber samples tested had the same nominal geometry: an outer core separation of 35 μm and an intrinsic helix period of 50-65 turns/m. Significant differences between individual samples are the minor variations in doping level among the cores.

OFDR data was used to determine the average Optical Path Ratio of the selected outer core triad vs. the center core. For each fiber sample, twist measurements were collected while the temperature or strain state of the fiber was changed. Temperature and strain inputs were changed independently. FIG. 21 shows the applied twist sensitivity in degrees of twist per meter per pm of center core wavelength response to temperature and strain for each sample as a function of Optical Path Ratio. The trends show that Optical Path Ratios can be tuned to minimize temperature or strain error. An optimized fiber would be designed with an Optical Path Ratio of 0.99995 to produce a sensor with applied twist that has near zero axial strain dependence, an Optical Path Ratio of 1.00006 to produce a sensor with applied twist that has near zero temperature dependence, and an Optical Path Ratio of 1.00002 to produce a sensor with applied twist that responds equally to a center core wavelength shift caused by either temperature or axial strain.

While this example embodiment alleviates the need for a fifth core in the shape computation, it also invokes a constraint on the fiber design. If data processing circuitry in the shape sensing system are limited such that interrogation of a fifth core is not feasible or undesirable in the acquisition system, the core dopants of the fiber draw can be controlled to make the applied twist largely immune to temperature or axial strain, or a simplified calibration matrix is created to compensate the applied twist signal for either temperature or axial strain change, although the calibration routine would not be able to identify which stimuli was the source of the applied twist change.

Thermally-Compensated Multi-Parameter Sensor

The technology described above has many example applications. Through the measurement of and correction for thermal effects coupled into the applied twist and strain signals, the technology measures temperature along with shape. The solution of Equation 20 is a stimulus vector containing shape parameters (strain, twist, curvature) and also temperature. The decoupling of temperature from the shape parameters gives a temperature measurement that is decoupled from strain. The resulting system is therefore a unified shape and strain-resistant temperature sensor that knows its own position accurately in 3-dimensional space.

In the example application of strain sensing, with no interest in other shape stimuli, temperature decoupling can be accomplished using just two outer cores with different dopants, and following the same procedure described, with a reduced 2×2 system of equations.

Although various embodiments have been shown and described in detail, the claims are not limited to any particular embodiment or example. None of the above description should be read as implying that any particular member, step, range, or function is essential such that it must be included in the claims scope. The scope of patented subject matter is defined only by the claims. The extent of legal protection is defined by the words recited in the allowed claims and their equivalents. All structural and functional equivalents to the members of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An optical fiber comprising:
   one or more primary optical cores having a first set of properties;
   one or more secondary optical cores having a second set of properties;
   wherein the one or more primary optical cores and the one or more secondary optical cores comprise a first core having a first radius and at least a second core having a second radius greater than the first radius, the cores being helically-wound around a center of the fiber, and
   wherein the primary set of properties includes a first temperature response and the secondary set of properties includes a second temperature response sufficiently different from the first temperature response to allow a sensing apparatus when coupled to the optical fiber to distinguish between temperature and strain induced by applied twist on the optical fiber.

2. The optical fiber in claim 1, wherein the optical fiber is configured as a strain sensor that senses strain independently from temperature.

3. The optical fiber in claim 1, wherein the difference in optical properties among the sets of cores is achieved by varying the doping level in each set of cores during fiber manufacture.

4. The optical fiber in claim 1, wherein the primary set of cores includes four cores and the secondary set of cores includes one core.

5. The optical fiber in claim 1, wherein a temperature response coefficient that scales an applied temperature change to measured spectral shift is at least is at least 2% larger or smaller in one or more the secondary cores than in the one or more primary cores to distinguish temperature from strain.

6. A method for interrogating an optical fiber having one or more primary optical cores with a first temperature response and one or more secondary optical cores with a second temperature response, the method comprising the steps of:
   detecting interferometric measurement data associated with each of the one or more primary optical cores and each of the one or more secondary optical cores when the optical fiber is placed into a sensing position;
   determining one or more compensation parameters that compensate for measurement errors caused by temperature variations along the optical fiber based on a difference between the first temperature response of the primary cores and the second temperature response of the secondary cores;
   compensating the detected interferometric measurement data using the one or more compensation parameters; and
   generating measurement data based on the compensated interferometric measurement data.

7. The method in claim 6, wherein the optical fiber is a shape sensing fiber and the method further comprises a calculation of shape and position of the shape sensing fiber which accounts for a linear response and a non-linear response of the shape sensing fiber to external stimuli in the detected interferometric measurement data.

8. The method in claim 7, wherein the non-linear response includes second-order responses to temperature, strain, twist, and curvature in the detected interferometric measurement data.

9. The method in claim 7, wherein the compensating step includes introducing a temperature measurement term in a shape computation matrix to eliminate twist measurement error resulting from the difference between the first temperature response of the primary cores and the second temperature response of the secondary cores, and wherein the temperature measurement term is based on the second temperature response.

10. The method in claim 9, further comprising performing a shape computation using multiple shape computation matrices to represent a system of equations that describe the linear and nonlinear responses of the optical fiber to external stimuli in the detected interferometric measurement data.

11. The method in claim 9, further comprising:
   minimizing or reducing a twist measurement error resulting from differences in strain and/or temperature response by tailoring a doping level of one or more of the cores.

12. An apparatus for interrogating an optical fiber having one or more primary optical cores with a first temperature response and one or more secondary optical cores with a second temperature response, the apparatus comprising:
   interferometric measurement circuitry configured to detect interferometric measurement data associated with each of the one or more primary optical cores and each of the one or more secondary optical cores when the optical fiber is placed into a sensing position, and
   data processing circuitry configured to:
      determine one or more compensation parameters that compensate for measurement errors caused by temperature variations along the optical fiber based on a difference between the first temperature response of the primary cores and the second temperature response of the secondary cores;
      compensate the detected interferometric measurement data using the one or more compensation parameters; and
      generate measurement data based on the compensated interferometric measurement data.

13. The apparatus in claim 12, wherein the generated measurement data is strain data compensated for temperature variations along the optical fiber.

14. The apparatus in claim 12, wherein the generated measurement data is temperature data compensated for strain variations along the optical fiber.

15. The apparatus in claim 12, further comprising:
   a display configured to display the generated measurement data,
   memory configured to store the generated measurement data.

16. The apparatus in claim 12, wherein the one or more primary optical cores and the one or more secondary optical cores comprise the first core, the second core, and at least three other cores helically-wound around the center of the fiber, and wherein the data processing circuitry is further configured to use interferometric measurement data from the first core, the second core, and the at least three other cores to distinguish between temperature and strain on the optical fiber induced by bending in two orthogonal directions of the optical fiber and between temperature and strain on the optical fiber induced by axial force on the optical fiber.

17. The apparatus in claim 12, wherein the optical fiber is a shape sensing fiber, and wherein the data processing circuitry is configured to calculate a shape and position of the shape sensing fiber which accounts for a linear response and a non-linear response of the shape sensing fiber to external stimuli in the detected interferometric measurement data.

18. The apparatus in claim 17, wherein the non-linear response includes second-order responses to temperature, strain, twist, and curvature in the detected interferometric measurement data.

19. The apparatus in claim 17, wherein the data processing circuitry is configured to use a shape computation matrix including a temperature measurement term to eliminate twist measurement error resulting from the difference between the first temperature response of the primary cores and the second temperature response of the secondary cores, and wherein the temperature measurement term is based on the second temperature response.

20. The apparatus in claim 19, wherein the data processing circuitry is configured to perform a shape computation using multiple shape computation matrices to represent a system of equations that describe the linear and nonlinear responses of the optical fiber to external stimuli in the detected interferometric measurement data.

21. The apparatus in claim 20, wherein the shape computation matrices characterize the linear and non-linear responses of the optical fiber including inter-dependence of first-order and second-order strain, temperature, twist, and curvature.

22. The apparatus in claim 20, wherein the interferometric measurement circuitry is configured to detect calibration interferometric measurement data including linear and non-linear responses of the optical fiber after individually isolating each of multiple stimulus parameters including temperature, strain, twist, and curvature, and wherein the data processing circuitry is configured to calibrate the shape computation matrices based on the calibration interferometric measurement data.

23. The apparatus claim 20, wherein the interferometric measurement circuitry is configured to detect calibration interferometric measurement data produced in response to multiple linearly-independent sets of stimuli vectors, and wherein the data processing circuitry is configured to calibrate the shape computation matrices based on the calibration interferometric measurement data to account for a non-minimized response to the multiple linearly-independent sets of stimuli vectors.

24. The apparatus in claim 20, wherein the data processing circuitry is configured to apply the calibrated shape computation matrices to the detected interferometric measurement data using a calculated or approximated inverse of the Jacobian matrix of the system of equations.

25. The apparatus in claim 20, wherein the data processing circuitry is configured to apply the calibrated shape computation matrices to the detected interferometric measurement data using a pre-computed approximation to the inverse of the Jacobian matrix of the system of equations.

26. The method in claim 6, further comprising distinguishing between temperature and strain induced by applied twist to the optical fiber based on the interferometric measurement data.

27. The apparatus in claim 12, wherein the data processing circuitry is configured to distinguish between temperature and strain induced by applied twist to the optical fiber based on the interferometric measurement data.

* * * * *